United States Patent
Huang et al.

(10) Patent No.: US 11,833,586 B2
(45) Date of Patent: Dec. 5, 2023

(54) SYSTEMS, METHODS, AND APPARATUSES FOR PRINTING 3D METALLIC PARTS FROM POWDER SUSPENSIONS

(71) Applicant: UNIVERSITY OF FLORIDA RESEARCH FOUNDATION, INCORPORATED, Gainesville, FL (US)

(72) Inventors: Yong Huang, Gainesville, FL (US); Marc Sole Gras, Gainesville, FL (US); Bing Ren, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 17/915,408

(22) PCT Filed: Mar. 26, 2021

(86) PCT No.: PCT/US2021/024289
§ 371 (c)(1),
(2) Date: Sep. 28, 2022

(87) PCT Pub. No.: WO2021/202261
PCT Pub. Date: Oct. 7, 2021

(65) Prior Publication Data
US 2023/0124780 A1 Apr. 20, 2023

Related U.S. Application Data

(60) Provisional application No. 63/001,793, filed on Mar. 30, 2020.

(51) Int. Cl.
*B22F 10/14* (2021.01)
*B33Y 10/00* (2015.01)
(Continued)

(52) U.S. Cl.
CPC .............. *B22F 10/14* (2021.01); *B22F 10/64* (2021.01); *B22F 12/10* (2021.01); *B29C 64/165* (2017.08);
(Continued)

(58) Field of Classification Search
CPC .......... B22F 10/14; B22F 10/64; B22F 12/10; B22F 2998/10; B22F 10/16; B22F 10/62;
(Continued)

(56) References Cited

U.S. PATENT DOCUMENTS

2016/0243619 A1    8/2016   Gothait et al.
2017/0056974 A1    3/2017   Miyashita et al.
(Continued)

FOREIGN PATENT DOCUMENTS

WO    WO-2019/083515 A1    5/2019

OTHER PUBLICATIONS

International Search Report and Written Opinion for International Application No. PCT/US2021/024289, dated Jul. 1, 2021, (19 pages), United States Patent and Trademark Office, US.

*Primary Examiner* — Rebecca Janssen
(74) *Attorney, Agent, or Firm* — ALSTON & BIRD LLP

(57) ABSTRACT

A three-dimensional (3D) printing method and apparatus are disclosed for freeform fabrication of metal articles. 3D printed articles are formed from a build material comprising metal powder(s), polymer(s), and solvent(s). A coagulation agent, such as a nebulized non-solvent, is disposed onto/about the build material during 3D printing to cause at least partial solidification of the build material to form a green body structure. Multiple build materials can be mixed at a variable ratio to achieve a composition gradient through the green body structure. The 3D printed green body structure can be heated to remove some or all of the polymer, solvent, and/or for debinding. The debinded green body structure can (Continued)

be sintered at a specific sintering temperature or over a temperature gradient, for a period of time, in accordance with the sintering properties of the particular metal powder in the debinded green body structure, to form a finished metal part.

20 Claims, 9 Drawing Sheets

(51) Int. Cl.
*B33Y 40/20* (2020.01)
*B22F 10/64* (2021.01)
*B33Y 30/00* (2015.01)
*B29C 64/30* (2017.01)
*B29C 64/165* (2017.01)
*B22F 12/10* (2021.01)

(52) U.S. Cl.
CPC .............. *B29C 64/30* (2017.08); *B33Y 10/00* (2014.12); *B33Y 30/00* (2014.12); *B33Y 40/20* (2020.01)

(58) Field of Classification Search
CPC ........ B22F 2999/00; B22F 7/06; B22F 10/60; B22F 12/55; B22F 12/58; B22F 3/1021; B29C 64/165; B29C 64/30; B33Y 10/00; B33Y 30/00; B33Y 40/20; B33Y 70/00; Y02P 10/25
See application file for complete search history.

(56) References Cited

U.S. PATENT DOCUMENTS

2018/0154574 A1   6/2018  Mark
2019/0337053 A1  11/2019  Moosberg et al.
2020/0246865 A1*  8/2020  Anthony ............... B22F 3/1021

* cited by examiner

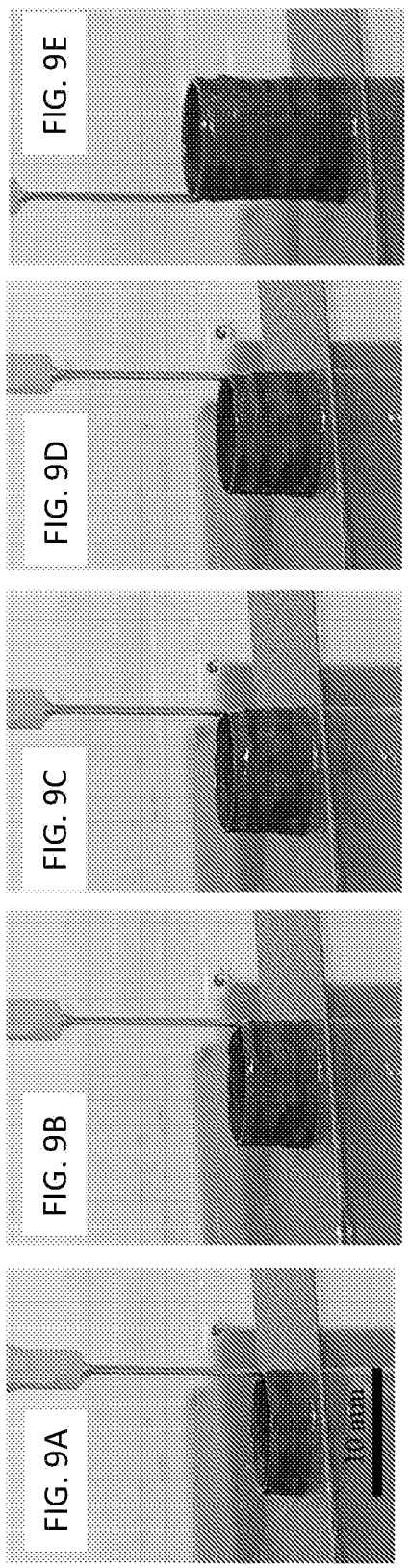
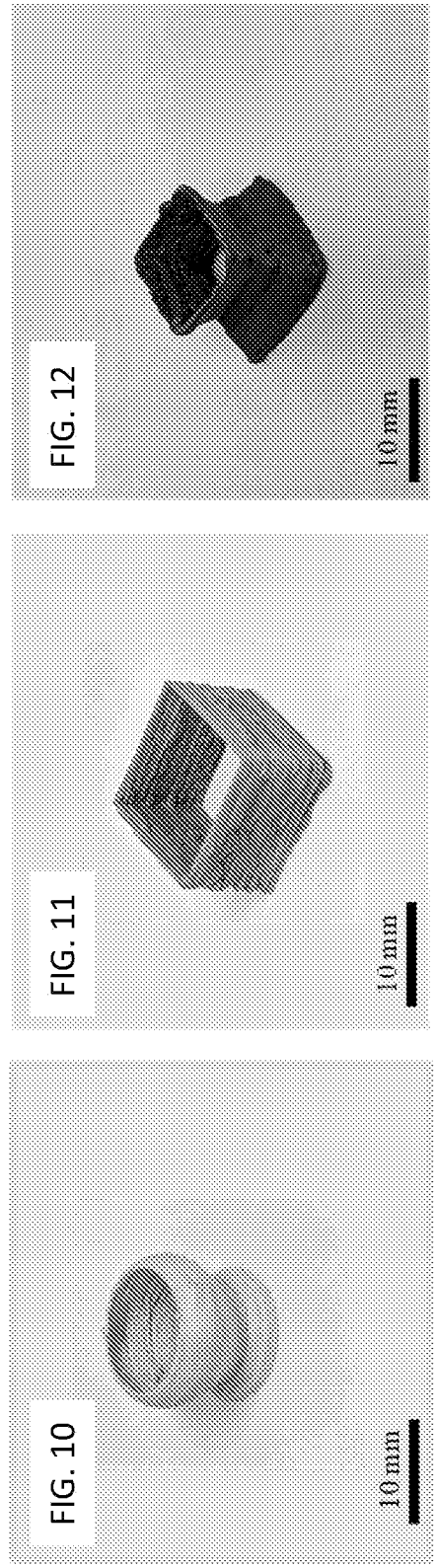

SYSTEMS, METHODS, AND APPARATUSES FOR PRINTING 3D METALLIC PARTS FROM POWDER SUSPENSIONS

CROSS-REFERENCE TO RELATED APPLICATIONS

This application is a National Stage Entry of International Patent Application No. PCT/US2021/024289, filed Mar. 26, 2021 and entitled "Systems, Methods, and Apparatuses for Printing 3D Metallic Parts from Powder Suspensions," which claims priority to, and the benefit of, under 35 U.S.C. § 119, U.S. Provisional Application No. 63/001,793, filed Mar. 30, 2020 and entitled "Systems, Methods, and Apparatuses for Printing 3D Metallic Parts from Powder Suspensions," the entire disclosures of each of which are hereby incorporated herein by reference in their entireties for all purposes.

TECHNICAL FIELD

Embodiments described herein relate generally to additive manufacturing, and more particularly to freeform additive manufacturing of metal articles.

BACKGROUND

Additive manufacturing, also commonly known as three-dimensional (3D) printing, encompasses a range of technologies used to fabricate parts by adding material to build up the part rather than by subtracting unwanted material away from a bulk starting workpiece. For freeform 3D printing of functional structures, extrusion, sometimes known as direct ink writing, can be used due to its ease of implementation, high efficiency, and wide range of printable materials. However, conventional methods and compositions are typically not appropriate for printing metallic parts. Through applied effort, ingenuity, and innovation, solutions to improve such apparatuses, systems, and methods have been realized and are described in connection with embodiments of the present invention.

BRIEF SUMMARY

A three-dimensional (3D) printing method and associated apparatus are disclosed for fabrication of 3D printed metal structures and articles. In some embodiments, the fabrication may be freeform or additive fabrication. In some embodiments, the 3D printed structures and articles may be formed from a build material, such as a build material comprising one or more metal powders, one or more binder materials, and one or more solvents. In some embodiments, at least partial solidification of the build material after printing can be facilitated with one or more coagulation agents, such as a non-solvent material or the like. In some embodiments, the at least partially solidified article can be referred to as a green body structure, and may, optionally, be fully solidified by submerging the green body structure in to a coagulation bath or by other means of exposing the green body structure to one or more coagulation agents or the like. In some embodiments, the green body structure can be heated to remove some or all of the one or more polymeric materials, some or all of the one or more solvents, and/or other materials, impurities, and/or contaminants from the green body structure. In some embodiments, the green body structure can be sintered at one or more temperatures or over a temperature gradient, for a period of time, e.g., in accordance with the sintering properties of the particular one or more metal powders in the green body structure.

In some embodiments, 3D printed structures and articles may be fabricated under ambient conditions and/or without the use of printed support structures which would need to be removed after 3D printing in order to achieve the finished structure or article. In some embodiments, a build material can be generated by combining one or more polymers and one or more solvents, such as by dissolved the one or more polymers in the one or more solvents, and adding the one or more metal powders. In some embodiments, the build material can be referred to as "the ink," "the printing material," or the like. In some embodiments, the build material can be disposed within a printing volume or onto a printing platform without the use of supports or other structures being previously, concurrently, or subsequently printed to support the build material while the build material solidifies or partially solidifies. In some embodiments, freeform printing can be carried out at ambient temperature and pressure. In some embodiments, just previous to, concurrent with, or just following the disposition of the build material into the printing volume or onto the printing platform, a volume of one or more coagulation agents, such as a coagulant, a non-solvent, variations thereof, or combinations thereof, can be disposed, such as by an aerosol sprayer or other suitable dispensing mechanism, to a volume directly adjacent the disposed build material. Without wishing to be bound by any particular theory, the one or more coagulation agents can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or other suitable changes to the one or more polymeric materials, thus forming a green body structure. As such, in some embodiments, a first volume of the build material can be printed, e.g., by a nozzle or the like, in a freeform manner directly into air and the one or more polymeric materials can be partially or fully solidified by disposing a first volume of the one or more coagulation agents sufficiently close by the printed first volume of the build material. In some embodiments, the nozzle can then be moved a distance, in one or more directions within the printing volume or across the printing platform, from the previous printing location, and the nozzle can be used to print a second volume of the build material, e.g., adjacent the first volume of the build material which is now partially or fully solidified. In some embodiments, a second volume of the coagulation agent can be disposed nearby the second volume of printed build material to partially or fully solidify the second volume of build material. In some embodiments, such a method or approach can be continued along a predetermined path of travel by the nozzle through the printing volume or across the printing platform in order to completely print the green body structure without being required to melt the one or more polymeric materials in the build material and allow them to solidify once printed, without using support structures, and/or without using a support bath or the like to maintain the structure of the printed article prior to completion of printing of the article. In some embodiments, the green body structure may be one in which some or all of the one or more polymeric materials are only partially solidified or for which further processing is helpful or required to achieve the fully solidified or fully coagulated green body structure in which some, most, or all of the one or more solvents are removed and/or in which some, most, or all of the one or more polymeric materials are solidified or coagulated. In some embodiments, the green body structure, once the one or more polymeric materials are fully or substantially fully coagulated and solidified, can be heated to remove some or all of the one or more solvents and/or some or all of the one or more polymeric materials. In some embodiments, heating can comprise heating the green body structure at a particular rate, from a first particular temperature (e.g., ambient or room temperature) to a second particular temperature (e.g., at which the one or more solvents are vaporized). In some embodiments, the green body structure can then be sintered in order to remove some or all of the one or more polymeric materials and cause inter-particle fusing of the one or more metal powders, thereby forming the finished metal article.

In some embodiments, a method for three-dimensional printing of a metal article can comprise: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the one or more non-solvents are operable to extract at least a portion of the one or more solvents from the green body structure. In some embodiments, once at least the portion of the one or more solvents are extracted from the green body structure, the one or more binder materials become at least partially solidified such that the green body structure experiences substantially no deformation, at a temperature, a pressure, and a humidity, over a period of time. In some embodiments, the one or more binder materials comprise one or more polymers that are configured to undergo a phase inversion in the presence of the one or more non-solvents. In some embodiments, the method can further comprise, in an instance in which only the portion of the one or more solvents are extracted from the green body structure such that the one or more binder materials become only partially solidified, disposing the green body structure into a coagulation bath to extract a remainder of the one or more solvents from the green body structure, thereby causing substantially complete solidification of the one or more binder materials. In some embodiments, the method can further comprise: heating the green body structure such that any remaining portion of the one or more solvents and the one or more binder materials are removed from the green body structure. In some embodiments, the heating causes at least partial vaporization of at least one of the remaining portion of the one or more solvents and the one or more binder materials. In some embodiments, the heating comprises sintering the green body structure, for a predetermined time, at a predetermined temperature, to form the metal part. In some embodiments, the printing is carried out using one or more printing nozzles. In some embodiments, the printing comprises an additive manufacturing process. In some embodiments, the method further comprises: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, the printing comprises printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the one or more binder materials have a volatilization temperature less than a sintering temperature of the one or more metal powders. In some embodiments, the printing is done at a first temperature substantially equivalent to room temperature. In some embodiments, the method can further comprise: vaporizing the one or more binder materials at a second temperature greater than the first temperature; and sintering the one or more metal powders at a third temperature greater than the second temperature. In some embodiments, the one or more metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, alloys thereof, mixtures thereof, or combinations thereof. In some embodiments, the one or more solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents, variants thereof, mixtures thereof, or combinations thereof. In some embodiments, the one or more binder materials may comprise at least one from among: a wax, a polymer, a gel, a semi-solid, or a metal. In some embodiments, the one or more binder materials may comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or combinations thereof. In some embodiments, the one or more non-solvents may comprise one or more of water, deionized water, water vapor, water having a miscible solvent dissolved therein, a non-solvent having a mutual miscibility with the chosen one or more solvents that satisfies a predetermined miscibility threshold, variants thereof, and combinations thereof.

In some embodiments, a method is provided for three-dimensional (3D) printing of a metal part, the method comprising: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways from the first nozzle; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways from the second nozzle; disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure; vaporizing the remaining one or more solvents, the one or more first binder materials and the one or more second binder materials; and sintering the one or more first metal powders and the one or more second metal powders to form the metal part.

In some embodiments, a method is provided for three-dimensional (3D) printing of a metal part, the method comprising: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part.

In some embodiments, a method can comprise, optionally, dissolving one or more polymeric materials in one or more solvents to form an intermediate build material, and then dispersing or otherwise disposing one or more metal powders into the intermediate build material to form a build material (also called herein "the liquid build material," "the ink," "the printing material," or "the printing suspension"). In some embodiments, the build material can comprise any suitable polymeric material such as a thermoplastic. In some embodiments, the one or more polymeric materials can be dissolved or dispersed in the one or more solvents, which can comprise any suitable solvent, e.g., based upon the interaction/dissolution chemistry of the one or more polymeric materials and the chosen one or more solvents. In some embodiments, such a solvent can comprise dimethyl sulfoxide (DMSO), and/or the like. In some embodiments, to form the build material, the one or more polymeric materials can be dissolved in the one or more solvents partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the one or more polymeric materials without causing molecular degradation or a reduction in the degree of polymerization (DP). The build material can further be formed by dispersing or disposing one or more metal powders in the polymer/solvent solution. In some embodiments, the room temperature process for forming the build material, according to some embodiments described herein, may require little or no heating of the printing materials, may result in little or no thermal deterioration of the polymers, and can reduce or eliminate the need for heating and/or melting the one or more polymeric materials before printing the green body structure.

According to another embodiment, an apparatus can be provided for 3D printing a metal article. In some embodiments, the apparatus can comprise: a printing space comprising an air-filled inner volume and a printing substrate; a reservoir configured to contain a supply of a liquid build material; a nozzle coupled to the reservoir and configured to dispose a volume of the liquid build material into the air-filled inner volume of the printing space; a nebulizer configured to nebulize a coagulation agent and disperse the nebulized coagulation agent within a predetermined distance of the disposed volume of liquid build material to at least partially coagulate the disposed volume of liquid build material; and a computing device configured to control movement of the nozzle and the disposing of the volume of the liquid build material into the air-filled inner volume of the printing space. In some embodiments, the nebulized coagulation agent may only partially coagulate the disposed volume of liquid build material to form an intermediate article. As such, in some embodiments, the apparatus can further comprise, optionally, a solidification bath comprising a coagulation solution, the solidification bath configured to, in an instance in which the nebulized coagulation agent only partially coagulates the disposed volume of liquid build material, receive the intermediate article and cause, via the coagulation fluid, the intermediate article to fully solidify, thereby forming the finished article.

According to an embodiment, a method can be carried out that comprises: disposing a printing material into a printing space according to a form factor associated with an article, the printing material comprising a plurality of metal particles, a binder material, and a solvent; and disposing a non-solvent into the printing space, thereby causing selective binding at least a portion of said printing material together to maintain said form factor of said article. In some embodiments, the printing material and the non-solvent are disposed into the printing space during a first time. In some embodiments, the method can further comprise: during a second time following the first time, heating said printing material to about a first temperature. In some embodiments, once the printing material is heated to said first temperature, a portion of at least one of the solvent, the non-solvent, or the binder volatilizes, forming a green body structure. In some embodiments, the method can further comprise: during a third time following the second time, heating said printing material to about a second temperature, the second temperature being higher than the first temperature. In some embodiments, once the printing material is heated to said second temperature, the green body structure sinters, forming the article.

According to another embodiment, an apparatus can be provided that comprises: means, such as a processor, a memory storing computer instructions, additive manufacturing equipment, a reservoir for storing build material or the like, one or more printing nozzles, a nebulizer, a printing volume, and/or the like. In some embodiments, the apparatus can comprise: means for disposing a printing material into a printing space according to a form factor associated with an article, the printing material comprising a plurality of metal particles, a binder material, and a solvent; and means for disposing a non-solvent into the printing space, thereby causing selective binding at least a portion of said printing material together to maintain said form factor of said article. In some embodiments, the printing material and the non-solvent are disposed into the printing space during a first time. In some embodiments, the apparatus can further comprise: means for, during a second time following the first time, heating said printing material to about a first temperature. In some embodiments, once the printing material is heated to said first temperature, a portion of at least one of the solvent, the non-solvent, or the binder volatilizes, forming a green body structure. In some embodiments, the apparatus can further comprise: means for, during a third time following the second time, heating said printing material to about a second temperature, the second temperature being higher than the first temperature. In some embodiments, once the printing material is heated to said second temperature, the green body structure sinters, forming a finished metal article.

According to yet another embodiment, a method for three-dimensional (3D) printing a metal part can be carried out, the method comprising: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the one or more non-solvents are operable to extract at least a portion of the one or more solvents from the green body structure. In some embodiments, once at least the portion of the one or more solvents are extracted from the green body structure, the one or more binder materials become at least partially solidified such that the green body structure experiences substantially no deformation, at a temperature, a pressure, and a humidity, over a period of time. In some embodiments, the one or more binder materials comprise one or more polymers that are configured to undergo a phase inversion in the presence of the one or more non-solvents. In some embodiments, the method can further comprise: in an instance in which only the portion of the one or more solvents are extracted from the green body structure such that the one or more binder materials become only partially solidified, disposing the green body structure into a coagulation bath to extract a remainder of the one or more solvents from the green body structure, thereby causing substantially complete solidification of the one or more binder materials. In some embodiments, the method can further comprise: heating the green body structure such that any remaining portion of the one or more solvents and the one or more binder materials are removed from the green body structure. In some embodiments, said heating causes at least partial vaporization of at least one of the remaining portion of the one or more solvents and the one or more binder materials. In some embodiments, said heating comprises sintering the green body structure, for a predetermined time, at a predetermined temperature, to form the metal part. In some embodiments, said printing is carried out using one or more printing nozzles. In some embodiments, said printing comprises an additive manufacturing process. In some embodiments, the method can further comprise: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, said printing comprises printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the one or more binder materials have a volatilization temperature less than a sintering temperature of the one or more metal powders. In some embodiments, said printing is done at a first temperature substantially equivalent to room temperature, the method further comprising: vaporizing the one or more binder materials at a second temperature greater than the first temperature; and sintering the one or more metal powders at a third temperature greater than the second temperature. In some embodiments, the one or more metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, alloys thereof, variants thereof, mixtures thereof, or combinations thereof. In some embodiments, the one or more solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents, variants thereof, mixtures thereof, or combinations thereof. In some embodiments, the one or more binder materials may comprise at least one from among: a wax, a polymer, a gel, a semi-solid, or a metal. In some embodiments, the one or more binder materials may comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or combinations thereof. In some embodiments, the one or more non-solvents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

According to still another embodiment, a method for three-dimensional (3D) metal printing can be carried out, the method comprising: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways; and disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure. In some embodiments, the method can further comprise: vaporizing the remaining one or more solvents, the one or more first binder materials and the one or more second binder materials. In some embodiments, the method can further comprise: sintering the one or more first metal powders and the one or more second metal powders to form a metal part, said metal part having a form factor substantially similar to that of the green body structure. In some embodiments, at least one of the one or more first metal powders and the one or more second metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, alloys thereof, variants thereof, mixtures thereof, or combinations thereof. In some embodiments, at least one of the one or more first solvents or the one or more second solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents, variants thereof, mixtures thereof, or combinations thereof. In some embodiments, at least one of the one or more first binder materials or the one or more second binder materials may comprise at least one from among: a wax, a polymer, a gel, a semi-solid, or a metal. In some embodiments, at least one of the one or more first binder materials or the one or more second binder materials may comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly (ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or combinations thereof. In some embodiments, at least one of the one or more first non-solvents or the one or more second non-solvents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

According to yet another embodiment, a method for three-dimensional (3D) printing of a metal part can be carried out, the method comprising: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part.

According to another embodiment, an apparatus for three-dimensional (3D) printing a metal part can be provided, the apparatus comprising: means, such as at least one processor and at least one memory comprising program instructions, the at least one memory and the program instructions being configured to, with the at least one processor, cause at least the following: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the at least one memory and the program instructions are further configured to, with the at least one processor, cause at least the following: heating the green body structure such that any remaining portion of the one or more solvents and the one or more binder materials are removed from the green body structure. In some embodiments, the apparatus can further comprise: one or more printing nozzles, wherein the at least one memory and the program instructions are further configured to, with the at least one processor, cause said printing using said one or more printing nozzles. In some embodiments, the at least one memory and the program instructions are further configured to, with the at least one processor, cause at least the following: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, the at least one memory and the program instructions are further configured to, with the at least one processor, cause at least the following: printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the at least one memory and the program instructions are further configured to, with the at least one processor, cause at least the following: vaporizing the one or more binder materials at a second temperature greater than the first temperature; and sintering the one or more metal powders at a third temperature greater than the second temperature, wherein said printing is carried out at a temperature substantially equivalent to room temperature.

According to still another embodiment, an apparatus can be provided for three-dimensional (3D) printing a metal part, the apparatus comprising: at least one processor; and at least one memory comprising program instructions, the at least one memory and the program instructions being configured to, with the at least one processor, cause at least the following: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways; and disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure. In some embodiments, the at least one memory and the program instructions are further configured to, with the at least one processor, cause at least the following: heating the green body structure such that any remaining portion of the one or more solvents and the one or more binder materials are removed from the green body structure. In some embodiments, the at least one memory and the program instructions are further configured to, with the at least one processor, cause at least the following: sintering the green body structure, for a predetermined time, at a predetermined temperature, to form the metal part. In some embodiments, the apparatus can further comprise: a first printing nozzle; and a second printing nozzle, wherein the at least one memory and the program instructions are further configured to, with the at least one processor, cause at least the following: printing, during said first time, the first printing suspension into the printing space in accordance with the one or more first printing pathways from the first nozzle; and printing, during said second time, the second printing suspension into the printing space in accordance with the one or more second printing pathways from the second nozzle. In some embodiments, said printing is done at a first temperature substantially equivalent to room temperature, wherein the at least one memory and the program instructions are further configured to, with the at least one processor, cause at least the following: vaporizing the one or more binder materials at a second temperature greater than the first temperature; and sintering the one or more metal powders at a third temperature greater than the second temperature.

According to still another embodiment, an apparatus can be provided for three-dimensional (3D) printing a metal part, the apparatus comprising: at least one processor; and at least one memory comprising program instructions, the at least one memory and the program instructions being configured to, with the at least one processor, cause at least the following: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part. In some embodiments, said printing is done at a first temperature substantially equivalent to room temperature, wherein the at least one memory and the program instructions are further configured to, with the at least one processor, cause at least the following: vaporizing the one or more binder materials at a second temperature greater than the first temperature; and sintering the one or more metal powders at a third temperature greater than the second temperature.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 9A-9E illustrate a hollow columnar article at different points during a 3D printing sequence, according to some embodiments of the present disclosure.

FIG. 10 illustrates a 3D printed hollow vase-like structure containing silver flakes, according to an embodiment of the present disclosure.

FIG. 11 illustrates a 3D printed iron-based, hollow square column, according to an embodiment of the present disclosure.

FIG. 12 illustrates a 3D printed nickel-based hollow constructed with a variable cross-section, according to an embodiment of the present disclosure.

DETAILED DESCRIPTION

Figure 1:
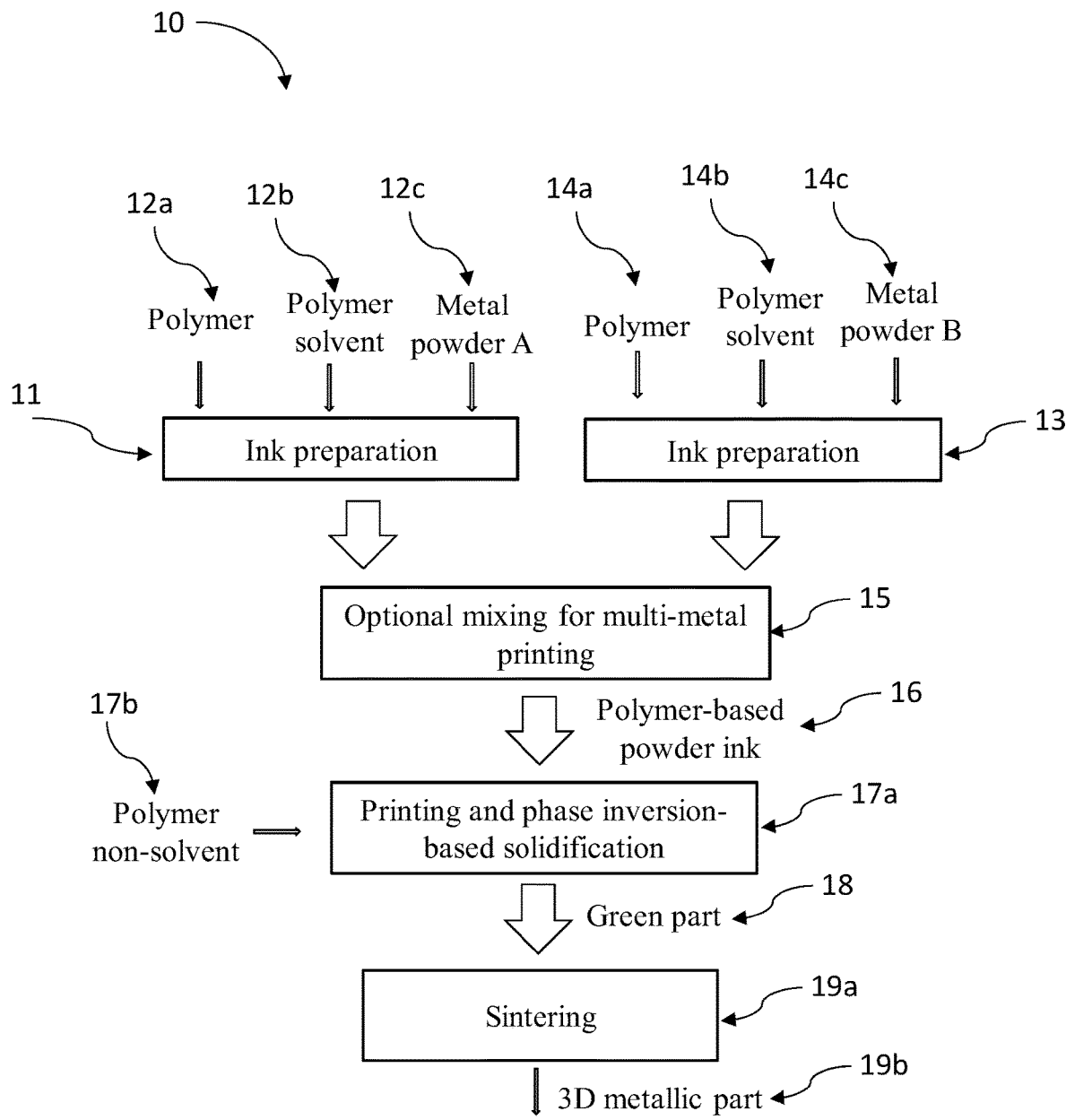
FIG. 1 provides a process flow diagram of a method for three-dimensional (3D) printing metal articles, according to an embodiment of the present disclosure.

Various embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative," "exemplary," and "example" are often used to indicate preferred examples, but is not meant to convey any indication of quality level, either relative to other intrinsic examples or relative to extrinsic examples. Like numbers refer to like elements throughout.

As used herein, the terms "instructions," "file," "designs," "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments. By way of example only, a design file for a printed article may be stored on a computer-readable medium and may be read by a computing device, such as described hereinbelow, for controlling part or all of a 3D printing process and associated apparatuses and components, according to various embodiments described herein.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 10% of the value stated, e.g., about 250 µm would include 225 µm to 275 µm, about 1,000 µm would include 900 µm to 1,100 µm. Any provided value, whether or not it is modified by terms such as "about," "substantially," or "approximately," all refer to and hereby disclose associated values or ranges of values thereabout, as described above.

Additive manufacturing, also referred to as three-dimensional (3D) printing, encompasses a range of technologies used to fabricate parts by building material up rather than by subtracting unwanted material away from a bulk starting workpiece.

Compared to traditional manufacturing, 3D printing enables mass customization, more freedom of designs to achieve complex structures, and reduced waste. Of various 3D printing build materials, metallic materials are particularly interesting due to their industrial application.

Conventionally, in order to achieve the goal of metal 3D printing, technologies such as energy-driven powder bed fusion and directed energy deposition have been discussed, however both technologies involve the partial or complete phase change of starting metallic power materials during printing. Such metal printing processes also typically require a high working temperature and controlled ambient environment. Likewise, these and other conventional technologies typically fail to achieve a suitably durable finished article with dimensions and a form factor that adequately reflect an initial digital design for the printed article.

Thus, the inventors have conceived of and diligently reduced to practice multiple embodiments of a system, method, compositions of matter, and apparatus for three-dimensional (3D) printing that enables freeform fabrication of metal structures and articles. According to some embodiments, such freeform fabrication can be carried out under ambient conditions. According to these and/or other embodiments, such freeform fabrication can be carried out without the use of support structures (e.g., printed support structures, solid support structures, support structures that are inherent to the printed article or the printing platform, support structures that should or must be removed after printing and before the printed article is ready for use, and/or the like). According to some embodiments, a build material (e.g., comprising one or more polymeric materials, one or more solvents, and one or more metal powders) can be prepared for printing according to a variety of possible printing methods (e.g., extrusion, injection, etc.) within an air-filled volume.

In some embodiments, an approach is provided for printing a 3D metallic green parts or green body structures from a build material comprising one or more sacrificial binder material-containing powder suspensions and solidified based on the phase inversion of the sacrificial binder material(s). According to some embodiments, the printed metallic green parts can be further sintered to for finished metallic parts while burning away the sacrificial binder material(s). In some embodiments, a metal printing approach is provided in which a sacrificial material (e.g., one or more polymeric materials) is used in the build material such that the build material can be directly printed to form the metallic green structures at room temperature. In some embodiments, the metallic green structures or green body structures can then be processed (e.g., thermally, chemically, radiologically, physically, via other suitable approaches, or combinations thereof) to remove the one or more polymeric materials and/or to sinter the metallic powders to form the finished metal article or part.

In some embodiments, the build material can be produced by mixing metallic powders with a polymeric solution, the polymeric solution comprising one or more polymeric materials disposed or dissolved in one or more solvents. In some embodiments, the one or more polymeric materials may function as a binder for the one or more metal powders and may act as a sacrificial material to be removed after green body formation and before or during sintering. In some embodiments, the build material is then printed into an air-filled printing space to form a 3D part. In some embodiments, one or more nozzles can be used to dispose or print the build material into the printing space at one or more particular points corresponding to a respective portion of a digital design of the part or article being printed. In some embodiments, a dispensing mechanism such as extrusion or ink-jetting nozzles may be used to print the build material into the printing space. In some embodiments, before, during, and/or after printing the build material, one or more coagulation agents (e.g., comprising a non-solvent agent) can be delivered to the part being printed (e.g., at or nearby the point within the printing space in which the building material is being printed). Without wishing to be bound by any particular theory, upon exposure of the printed, liquid build material to the one or more coagulation agents, the build material may become at least partially solidified at least in part due to a reaction between and/or an exchange of the one or more coagulation agents with the one or more solvents, which may result in the cross-linking and/or coagulation of the one or more polymeric materials. Once partially or fully solidified, the build material will retain the shape, size, position, and orientation as printed and the one or more nozzles can be moved further along a predetermined path of travel within the printing space and continue to be used to print other portions of the build material into the printing space at other points that correspond to other portions of the digital design for the part or article. Once all portions of the part or article are printed and the one or more coagulation agents are used to at least partially solidify each portion of the part or article, the green body structure is formed, the green body structure being substantially durable against deformation due to normal handling or moving of the green body structure, gravitational forces, loss due to evaporation or vaporization of solvents or other materials within the green body structure, and/or the like. In some embodiments, the green body structure may be only partially solidified, in which case further coagulation agents can be delivered to the green body structure or the green body structure can be submerged or partially submerged in a coagulation bath or the like in order to fully or substantially fully solidify the green body structure. IN some embodiments, the green body structure can have dimensions and a form factor that is similar to, an engineered relationship with, is substantially equal to, or is equal to the dimensions and form factor of the desired finished part or article, according to the digital design. In some embodiments, the green body structure may be engineered to be larger than or have a form factor that is intentionally different from the finished part or article in order to take into account an estimated, predicted, or known reduction in one or more dimensions and/or a change in part or all of the form factor of the green body structure relative to the finished metal structure, article, or part, due to the removal of binder materials and/or the like during sintering.

In some embodiments, since the build material is prepared as a suspension, various metal powders can be easily mixed at different ratios in situ and controllably deposited for parts with a functional gradient as designed. In some embodiments, the non-solvent may extract some or all of the solvent away from the green body structure due to a higher Hansen chemical solubility or affinity with the solvent and can then partially or fully solidifies the green body structure based on a phase inversion mechanism of the one or more polymeric materials. In some embodiments, the printed part can be further processed as needed in a coagulation bath for complete solidification as a green part. In some embodiments, at this stage, the partially or fully solidified one or more polymeric materials may act as a binding agent for the one or more metal powders (also referred to herein as "metal particles"). In some embodiments, the consumed solvent can be reclaimed for recycling and reuse. In some embodiments, the printed green part can be heated up to the sintering temperature of the one or more metallic powders to remove the sacrificial binder (e.g., one or more polymeric materials) and sinter the metallic powders to make the final metal part, structure, or article.

Described hereinbelow are examples in which different single metal powders, such as iron, copper, nickel, silver, and the like, were printed to form a 3D article by mixing each of them with a solution prepared from a sacrificial polymer (e.g., acrylonitrile-butadiene-styrene (ABS)) and a solvent (e.g., dimethyl sulfoxide (DMSO)) as example components of an example build material. In some embodiments, metal-ABS-DMSO build material was extruded in air to fabricate continuous conduits, shells and bulky parts for demonstration purposes. During printing, water was used as an example non-solvent for the metal-ABS-DMSO build material and was delivered to filaments being deposited using a nebulizer in an enclosed chamber where the extracted solvent was reclaimed. After printing, the semi-solidified part was submerged in a water-based coagulation bath for complete solidification and the residual solvent was reclaimed from the bath through a distillation process. The printed parts were then sintered under proper heating cycles according to the different example metal powders used. According to various examples, metal parts were 3D printed by using a dissolved sacrificial polymer binder and metal powder suspension as a printing platform while a non-solvent agent was simultaneously or nearly simultaneously delivered to form a green body structure (also described herein as "green part," "green article," or "green structure"), allowing an in-air metal printing process that is quicker, safer for users, more energy efficient, requires less post processing, and results in mechanically superior printed metal parts, structures, and articles. In some embodiments, the green part was subjected to a sintering cycle to burn away the binding agent and sinter the metal particles, fusing them together and obtaining a fully metallic part. In some embodiments, part shrinkage and porosity during sintering were pre-compensated during the part design phase. In some embodiments, more than a single binder polymer may be used to minimize the possible porosity by removing them sequentially (e.g., at different times during the temperature ramping period due to the different binder polymers having different vaporization temperatures) during the post-processing phase.

Referring now to FIG. 1, a 3D printing process 10 for fabricating metal parts is provided which includes three or more steps, including for example: powder ink preparation, freeform printing, and post-printing sintering. While the one or more polymers are illustrated and/or described generally as being the binder/sacrificial materials in FIG. 1, other soluble binder materials can be used as sacrificial materials too, e.g., waxes, lower melting point metals, etc. According to some embodiments, the 3D printing process 10 comprises preparation of a first ink 11 by combining one or more first polymers 12a, one or more first solvents 12b, and one or more first metal powders 12c. The 3D printing process 10 can further comprise, optionally, preparation of a second ink 13 by combining one or more second polymers 14a, one or more second solvents 14b, and one or more first second powders 14c. In some embodiments, the mentioned mixture description serves the purpose of illustration of the multi-material capabilities of the proposed process, and it does not intend to limit the mixing method uniquely to two inks, as the described approach can be used to mix simultaneously more than two ink compositions.

In some embodiments, forming the ink or build material can involve mixing metal powders (e.g., 12c or 14c) with a respective polymer solution, which is prepared by dissolving one or more polymeric materials in one or more suitable solvents ((12a in 12b, or 14a in 14b, respectively) in order to obtain a homogeneous powder ink suspension for printing. In some embodiments, first one build material (e.g., A) and then the other build material (e.g., B) can be printed to form different portions of the printed article. In other embodiments, the 3D printing process 10 can further comprise, optionally, mixing 15 two or more build materials (inks) together to form a multi-metal printing material 16. In some embodiments, two or more different build materials (e.g., A and B) can be prepared and then combined according to any suitable ratio in order to achieve a specific composition to print a particular portion of the green body structure such that the corresponding portion of the finished metal article, part, piece, or structure likewise ha a corresponding ratio of a first and second (or more) metal particles. In such a manner, a particular portion, portions, or all of the finished article can comprise a binary, ternary, quaternary, quintenary, or other such metal composition. In some embodiments, a desired powder ink suspension containing different metal powders (e.g., A and B) can be prepared by mixing them at a given ratio by changing the mixing inputs from each starting ink.

In some embodiments, the 3D printing process 10 can further comprise printing and solidifying 17a the build material (e.g., A or B), or the multi-metal build material 16. In some embodiments, an applicable dispensing mechanism, such as material extrusion or material jetting, can be used to dispense the ink(s) or building material(s) into a printing space according to a layer-by-layer deposition approach or any other suitable approach, e.g., having an article building block of a material filament, a material droplet, or the like. In some embodiments, printing and solidifying 17a can be carried in an enclosed chamber to collect any released solvent and to minimize user exposure to the materials or process and to reduce contamination or detrimental external or environmental impacts on printing quality. In some embodiments, during printing and solidifying 17a, a polymer non-solvent agent 17b can be delivered to the location, space, position, environment, or sub-volume of the enclosed chamber where the metal-polymer composite part is being printed. In some embodiments, the polymer non-solvent agent 17b may solidify or partially solidify some or all of the polymer(s) in the build material (e.g., A, B, or 16) to retain deposited features and thereby entrapping the metal powders distributed in the deposited building block.

In some embodiments, the printing and solidification process 17a may be known as phase inversion in instances in which solidification is based on or includes the phase separation of a homogeneous polymer solution in a non-solvent medium in which the polymer does not dissolve and with which the solvent in the solution is fully miscible. In some embodiments, as the polymer non-solvent and polymer solvent present higher Hansen solubility than the Hansen solubility exhibited between the polymer and the solvent, the non-solvent, if properly chosen according to the particular polymer(s) and solvent(s) chosen, may have sufficient affinity to replace the solvent within the polymer solution. As such, in some embodiments, the rate at which phase inversion occurs may highly depend on the degree of solubility of the solvent in the non-solvent and the insolubility of the polymer in the non-solvent. In some embodiments, a similar principle may hold for systems in which more than one polymer, more than one solvent, and/or more than one non-solvent (also described herein as a "coagulation agent") are used. In some embodiments, the phase inversion process may be induced, at least in part, by depositing the ink in a non-solvent-rich environment or disposing/deploying non-solvent or coagulation agent material nearby the printed or deposited ink.

In some embodiments, the phase inversion process may begin at or near an outer surface of deposited filaments/droplets when in contact with the active non-solvent agent in the printing environment. In some embodiments, once the surface is partially or fully solidified, a coagulation front may travel inwards within each filament/droplet of printed build material/ink, e.g., through diffusion of the non-solvent through each filament/droplet, and may extract some or all of the solvent from respective filaments/droplets of the printed structure. In some embodiments, this simultaneous or nearly simultaneous solidification of build material concurrent with printing of the build material may be controlled in such a way that solidification occurs only partially, e.g., in order to achieve a balance between achieving sufficient fusion between adjacently deposited layers, filaments, or droplets, due to the build material not being fully deposited, and achieving sufficient stiffness to support subsequently printed layers in air due to the existence of previously solidified or partially solidified build material (e.g., the one or more polymeric materials in the build material of a first layer may be coagulated or solidified enough such that a second layer of build material can be deposited on or supported on or stabilized by the first layer of build material). In some embodiments, through such phase inversion and other coagulation/solidification approaches, the 3D printing process 10 can further comprise formation of a green part 18 (also referred to herein as "green body structure").

In an instance in which the green part 18 is only partially coagulated or solidified through exposure to the one or more coagulation agents/non-solvents, further coagulation or solidification may be necessary before the green part 18 is ready for post-printing processing. In some embodiments, in order to achieve complete or nearly complete solidification throughout a printed part, the green part 18 can be immersed, if needed, in a coagulation bath to fully remove the solvent. In some embodiments, the collected solvent-relevant solution from the printing chamber and coagulation bath are post-processed in order to reclaim the solvent for its reuse, minimizing its environmental impact. In some embodiments, variable metal powder suspensions can be mixed, prior to printing, to achieve a desired composition, and can be controllably deposited as a composition gradient structure during the printing and solidification process 17a. Said otherwise, in some embodiments, the ratio of a first and second build material (or a first, second, and third build material, etc.) can be changed dynamically during the printing and solidification process 17a such that a composition of the green part 18 achieves a compositional gradient between two locations, portions, regions, or sub-parts of the green part 18.

In some embodiments, the 3D printing process 10 can further comprise sintering 19a the green part 18 according to a suitably high temperature sintering cycle chosen from among a plurality of suitable sintering cycles according to the metal powder(s) used in the green part 18, to achieve the finished 3D printed metal part 19b. In some embodiments, the sintering cycle can comprise a binder/polymer removal process at lower temperatures than the sintering level. In some embodiments, the binder/polymer removal process (also referred to herein as "binder burnout process") can be carried out to melt, decompose, vaporize, and/or evaporate the binder(s)/polymer(s) from the green part 18. In some embodiments, the binder burnout process must be carefully designed and controlled in order to avoid disruption of the macro structures of the printed part and/or the intra-/inter-metal particle fusing, ordering, structure, crystallization, etc. In some embodiments, the sintering 19a can occur at sufficiently high temperatures that are below the melting point of the metal powder or metal powders.

Without wishing to be bound by any particular theory, at such temperatures, the metal particles may start to fuse with each other due to atomic diffusion, as the atoms can move easily and migrate quicker along the particle-particle interfaces and inter-particle contact surfaces. Without wishing to be bound by any particular theory, at least some of the mechanisms that may contribute to sintering of a consolidated mass of crystalline particles are surface and grain boundary diffusion, which may be heavily dependent on the particle size and the material properties, and vapor transport and plastic flow, which entails the capability of the metal to permeate the gases obtained from the sintering process and which may impact the resulting porosity of the sintered metal part. In some embodiments, residual porosity may be found in powder metallurgy fabricated parts on the order of between about 1% and about 5%, however any suitable porosity can be achieved and is therefore contemplated as part of this disclosure. In some embodiments, the specifications of the thermal sintering cycle may depend on the binding polymers and metal powder(s) used, as well as the dimensions and/or form factor of the printed structure. In some embodiments, after sintering and taking into account the porous nature of the resulting part, the porous printed part can be, if needed, further infiltrated with suitable materials to ensure the pores are further filled, partially filled, nearly fully filled, or fully filled. In addition to the porosity, 3D printed metal parts may experience shrinkage during sintering. As such, the design, dimensions, and form factor for the green part 18 can be pre-compensated during the part design phase such that the sintered metal part adheres to the desired form factor and dimensions after the accounted-for sintering-induced shrinkage. In particular, in some embodiments, different binder polymers may be used to minimize the possible porosity by removing them sequentially during the post-processing phase.

In some embodiments, a system can be provided for carrying out the 3D printing process 10. In some embodiments, such a system may comprise an enclosed printing space, one or more printing nozzles, one or more coagulation agent delivery elements, one or more reservoirs configured to store a supply of one or more build materials, and a computing entity configured to: load and interpret a digital design of the green part 18, control movement of the printing nozzles, deliver build material via the printing nozzles, move the one or more coagulation agent delivery elements, deliver coagulation agent via the one or more coagulation agent delivery elements, and the like. In some embodiments, the system can further comprise a coagulation bath into which the green part 18 can be at least partially submerged in an instance in which the build material only partially or insufficiently solidifies during the interaction between the solvent and coagulation agent. In some embodiments, the system can further comprise a sintering oven operable to control a temperature, change in temperature, pressure, humidity, and/or other characteristics and parameters of an inner volume of the sintering oven. In some embodiments, the green part 18 can be loaded into the sintering oven and sintered to achieve the finished, printed metal article. In some embodiments, the enclosed printing space may function as the sintering oven such that the green part 18 can be printed in air and supported on a substrate within the enclosed printing space in the presence of coagulant, and then the green part 18 can be sintered without removing the green part 18 from the inner volume of the enclosed printing space.

In some embodiments, part of the 3D printing process 10 can, optionally, comprise the formation of a design for the green part 18 that accounts for any shrinkage during sintering. In some embodiments, the 3D printing process 10 can, optionally, comprise a computer-implemented or computer-controlled printing process whereby a computing entity or the like can interpret a digital design of the green part 18, map out one or more predetermined nozzle pathways within the enclosed printing space, move or cause movement of one or more nozzles according to the one or more predetermined nozzle pathways and a deposition rate of each nozzle to adequately deposit the build material at a suitable rate with respect to each location and rate of movement of each nozzle in order to deposit the correct type and quantity of build material at each location within the printing space that corresponds with a respective portion of the green part 18. In some embodiments, the 3D printing process 10 can, optionally, comprise a computer-implemented or computer-controlled printing process whereby a computing entity or the like can determine, for each nozzle of the one or more nozzles, a ratio of different build materials when a design for the green part 18 necessitates a build material that is achieved or achievable by combining two or more prepared build materials. In some embodiments, the 3D printing process 10 can, optionally, comprise a computer-implemented or computer-controlled printing process whereby a computing entity or the like can determine, based upon the one or more predetermined nozzle pathways, one or more predetermined nebulizer pathways for delivering one or more coagulation agents to the printed build material simultaneously or nearly simultaneously with the printing of the respective portions of the green part 18. In some embodiments, the 3D printing process 10 can, optionally, comprise a computer-implemented or computer-controlled printing process whereby a computing entity or the like can control a temperature and a temperature ramp rate for a vaporization/burnout process and/or the sintering 19*a*. As such, an aspect of this disclosure deals with the use of computing entities, either as part of an apparatus or system or external to the apparatus or system, to carry out these and other aspects of the 3D printing process 10, other tasks and processes described herein, the methods described and claimed, and the like.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Example Systems and Apparatuses

Figure 2:
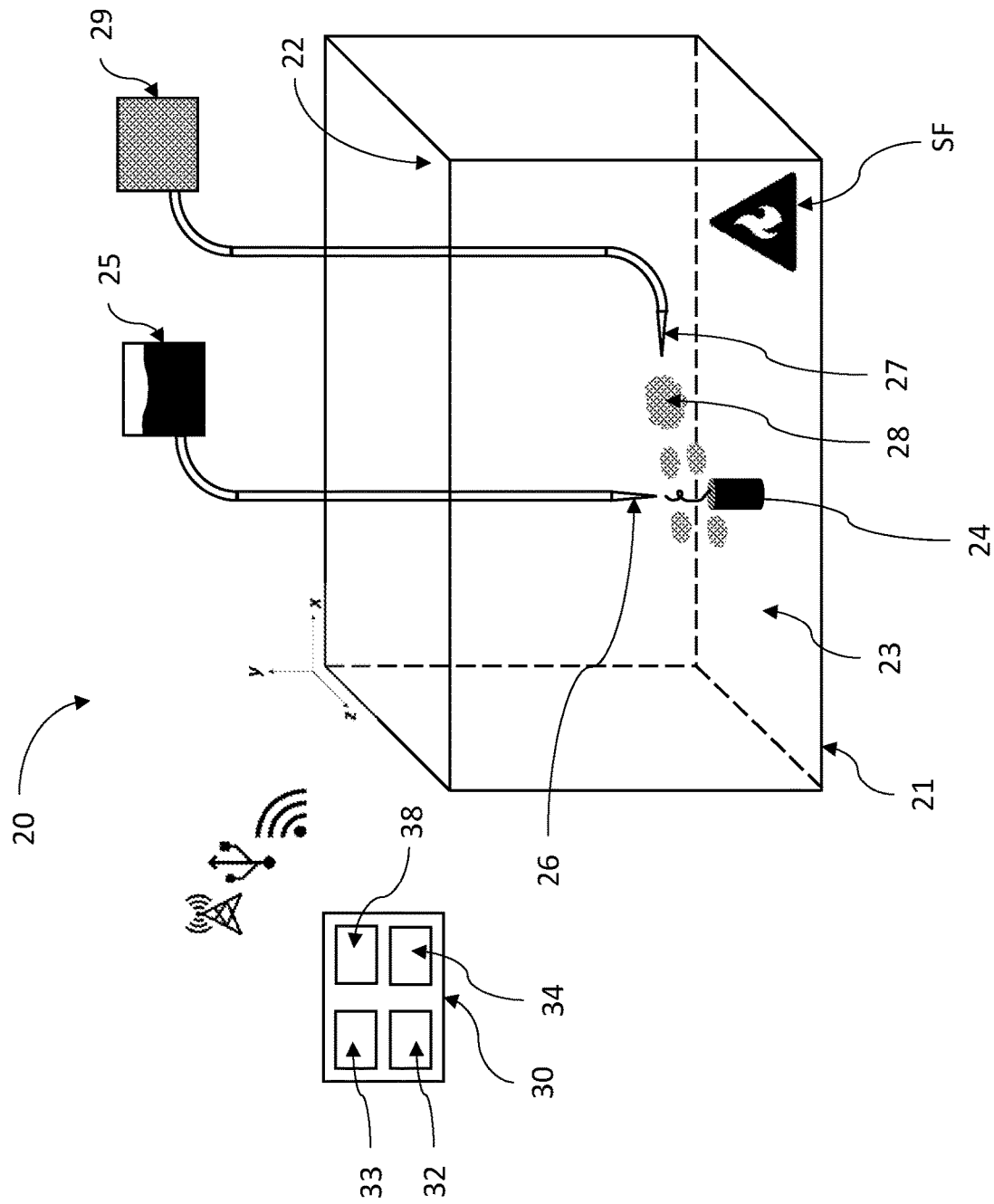
FIG. 2 provides a schematic illustration of an apparatus for 3D printing metal articles, according to an embodiment of the present disclosure.

FIG. 2 provides, according to one or more embodiments of the present disclosure, an apparatus 20 for solvent-assisted 3D printing of metal parts at ambient temperature and pressure, without the use of a support bath or printed solid supports during printing, and without melting the polymeric material in the build material to render the build material sufficiently plastic for printing. The apparatus 20 comprises a printing environment 21, which may be enclosed or open, but nevertheless defines an inner volume 22 and comprises a printing substrate 23. The apparatus 20 can be operably configured to 3D print a self-supporting article 24 (e.g., such as the green part 18) supported on the printing substrate 23 and being self-supporting across a wide degree of article complexities. The apparatus 20 can further comprise an ink reservoir 25 configured to store a supply of a metal-polymer-solvent-containing ink that comprises one or more solvents, one or more polymeric materials, and one or more metal powders. In some embodiments, the ink reservoir 25 can be operably coupled to a printing nozzle 26 that is dimensioned and configured to receive, from the ink reservoir 25, a portion or flow of the ink. The printing nozzle 26 can be configured to be moved in three dimensions (x, y, and z) within the inner volume 22 of the printing environment 21 and to dispose discrete volumes or continuous flows of the ink to particular locations within the inner volume 22 that are associated with the self-supporting article 24, as desired. Said otherwise, the printing nozzle 26 can be configured to dispose volumes or a flow of the ink onto the printing substrate 23 or onto a previously printed portion of the self-supporting article 24, in the inner volume 22, e.g., an air-filled inner volume, and to move in three dimensions such that particular volumes of the ink are deposited at corresponding particular points and locations such that the dimensions, form factor, and characteristics of the self-supporting article 24, once fully printed, are in line with those desired or in line with an initial design for the self-supporting article 24. To do so, the printing nozzle 26 may be configured to deposits the ink into the inner volume 22 according to a pre-determined route, pathway of travel, timeline, or printing schedule.

In some embodiments, the apparatus 20 can further comprise a nebulizer 27 configured to nebulize and disperse a coagulation agent 28 within the inner volume 22 of the printing environment 21. The nebulizer 27 can be configured to receive a supply of the coagulation agent 28 from a coagulation agent reservoir 29. In some embodiments, at a predetermined time before, during, or after the printing nozzle 26 deposits the ink into the inner volume 22, e.g., according to the pre-determined route or printing schedule, the nebulizer 27 can be configured to nebulize a volume of the coagulation agent and disperse the nebulized volume of the coagulation agent nearby the printing nozzle 26 and/or nearby the deposited ink. In some embodiments, the predetermined time may be selected from a predetermined temporal range on either side of the time at which the ink is deposited from the printing nozzle 26 into the inner volume 22 at respective particular locations. In some embodiments, "nearby" the printing nozzle 26 or the deposited ink may refer to a location within a predetermined distance of the printing nozzle 26 or within a predetermined distance of the deposited ink. In some embodiments, the nebulizer 27 may be configured to disperse the coagulation agent 28, once nebulized, before, during, and after deposition of the ink such that sufficient physical and chemical interaction with the deposited ink and the coagulation agent 28, once nebulized, is possible. In some embodiments, the nebulizer 27 may be configured to move in three dimensions (x, y, and z) in concert with or alignment with the movements of the printing nozzle 26. In some embodiments, more than one nozzle, e.g., such as more than one of the printing nozzle 26, and/or more than one nebulizer, e.g., such as more than one of the nebulizer 27, may be concurrently used during printing, such as for printing different portions of a large or complex article, e.g., the self-supporting article 24.

In some embodiments, the apparatus 20 can comprise a sintering furnace SF element configured to increase a temperature in the inner volume 22 of the of the printing environment 21 in order to carry out debinding and/or sintering of the self-supporting article 24 following partial or full coagulation. In some embodiments, the printing nozzle 26 and nebulizer 27 can be removed from the inner volume 22 of the printing environment 21 and the printing environment 21 can be enclosed, and then the SF element can be caused to increase the temperature to at or above a debinding temperature and/or at or above a sintering temperature, which can be determined based upon the specific binder (e.g., polymeric) materials and metal powders used in forming the self-supporting article 24 (e.g., the green part 18). In some embodiments, the sintering process can be carried out in separate equipment, such as a standalone sintering furnace or the like.

In some embodiments, the apparatus 20 may comprise or be in communication with a computing device 30 that is operable to cause or control one or more of the movements of the printing nozzle 26, the provision of ink from the ink reservoir 25 to the printing nozzle 26, the rate of deposition of ink from the printing nozzle 26, the movements of the nebulizer 27, the provision of the coagulation agent 28 from the coagulation agent reservoir 29 to the nebulizer 27, the rate of nebulization of the coagulation agent 28 by the nebulizer 27, the rate and/or distance of dispersal of the coagulation agent 28 from the nebulizer 27, the commencement or termination of printing and/or nebulization, other similar properties or activities within or about the printing environment 21, combinations thereof, and/or the like.

In some embodiments, the computing device 30 can comprise one or more processing elements 32, one or more non-volatile memories 33, one or more volatile memories 34, and/or one or more transmitter/receivers 38 (e.g., "transceivers 38"). In some embodiments, the computing device 30 is configured to store one or more computer program products, computer program code, a computer-readable media comprising instructions, and/or the like. In some embodiments, the computing device 30 is configured to determine, using a starting position, a manual input, sensors, a geospatial coordinate system, or the like, a current position of the printing nozzle 26, the nebulizer 27, and/or the like. In some embodiments, the computing device 30 is configured to determine, using any suitable means, a current ink level in the ink reservoir 25 and/or a current coagulation agent level in the coagulation agent reservoir 29. In some embodiments, the computing device 30 is configured to be in wired or wireless communication, such as via the transceivers 38, with one or more motors (not shown) or the like that are configured to move the printing nozzle 26, the nebulizer 27, or other components of the apparatus 20 within the inner volume 22 of the printing environment 21. In some embodiments, the computing device 30 can be configured to communicate a set of instructions to the one or more motors, or the like, for a series of movements of the printing nozzle 26 within the inner volume 22 of the printing environment 21. In some embodiments, the computing device 30 can provide movement instructions to the one or more motors, or the like, for making a series or sequence of movements of the printing nozzle 26 which are necessary to print the self-supporting article 24 in its entirety. In some embodiments, the computing device 30 can provide movement instructions to the one or more motors, or the like, for making a series or sequence of movements of the nebulizer 27 such that the nebulizer 27 follows the movements of the printing nozzle 26 in order to achieve or maintain a distance between the nebulizer 27 and the printing nozzle 26 that is sufficient to at least partially coagulate the one or more polymeric materials in the build material as it is disposed from the printing nozzle 26. In some embodiments, the computing device 30 can provide flow rate instructions, e.g., in conjunction with movement instructions, to one or more of the ink reservoir 25, the printing nozzle 26, the nebulizer 27, or the coagulation agent reservoir 29 in order for the proper flow rate or discrete volume of polymeric ink or the coagulation agent 28, once nebulized, is disposed or dispersed at a correct corresponding location within the inner volume 22 of the printing environment 21 such that the apparatus 20 can achieve the self-supporting article 24, as desired.

Example Computing Entity

Figure 3:
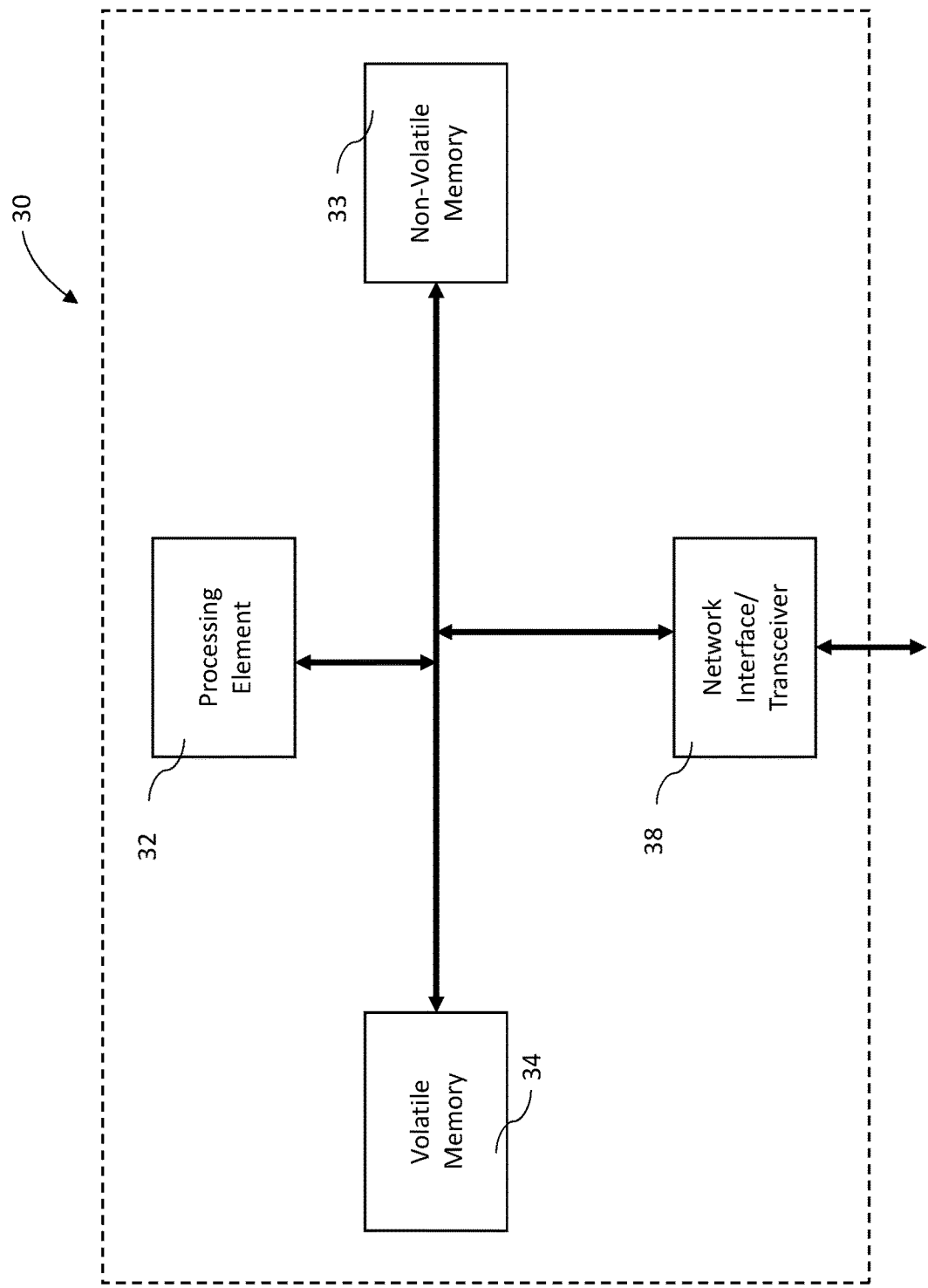
FIG. 3 provides a schematic of an example computing device configured to 3D print according to any of the approaches or methods of the present disclosure.

FIG. 3 provides a schematic of the computing device 30 according to one embodiment of the present invention. In general, the terms computing device, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 3, in one embodiment, the computing device 30 may include or be in communication with one or more processing elements 32 (also referred to as processors, processing circuitry, and/or similar terms used herein interchangeably) that communicate with other elements within the computing device 30 via a bus, for example. As will be understood, the processing element 32 may be embodied in a number of different ways. For example, the processing element 32 may be embodied as one or more complex programmable logic devices (CPLDs), microprocessors, multi-core processors, coprocessing entities, application-specific instruction-set processors (ASIPs), microcontrollers, and/or controllers. Further, the processing element 32 may be embodied as one or more other processing devices or circuitry. The term circuitry may refer to an entirely hardware embodiment or a combination of hardware and computer program products. Thus, the processing element 32 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 32 may be configured for a particular use or configured to execute instructions stored in volatile or non-volatile media or otherwise accessible to the processing element 32. As such, whether configured by hardware or computer program products, or by a combination thereof, the processing element 32 may be capable of performing steps or operations according to embodiments of the present invention when configured accordingly.

In one embodiment, the computing device 30 may further include or be in communication with non-volatile media (also referred to as non-volatile storage, memory, memory storage, memory circuitry and/or similar terms used herein interchangeably). In one embodiment, the non-volatile storage or memory may include the one or more non-volatile memories 33, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 30 may further include or be in communication with volatile media (also referred to as volatile storage, memory, memory storage, memory circuitry and/or similar terms used herein interchangeably). In one embodiment, the volatile storage or memory may also include one or more volatile memories 34, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 32. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 30 with the assistance of the processing element 32 and operating system.

In some embodiments, the computing device 30 may also include one or more network interfaces, such as a transceiver 38 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 30 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 30 may include or be in communication with one or more input elements, such as a keyboard input, a mouse input, a touch screen/display input, motion input, movement input, audio input, pointing device input, joystick input, keypad input, and/or the like. The computing device 30 may also include or be in communication with one or more output elements (not shown), such as audio output, video output, screen/display output, motion output, movement output, and/or the like.

Example External Computing Entity

Figure 4:
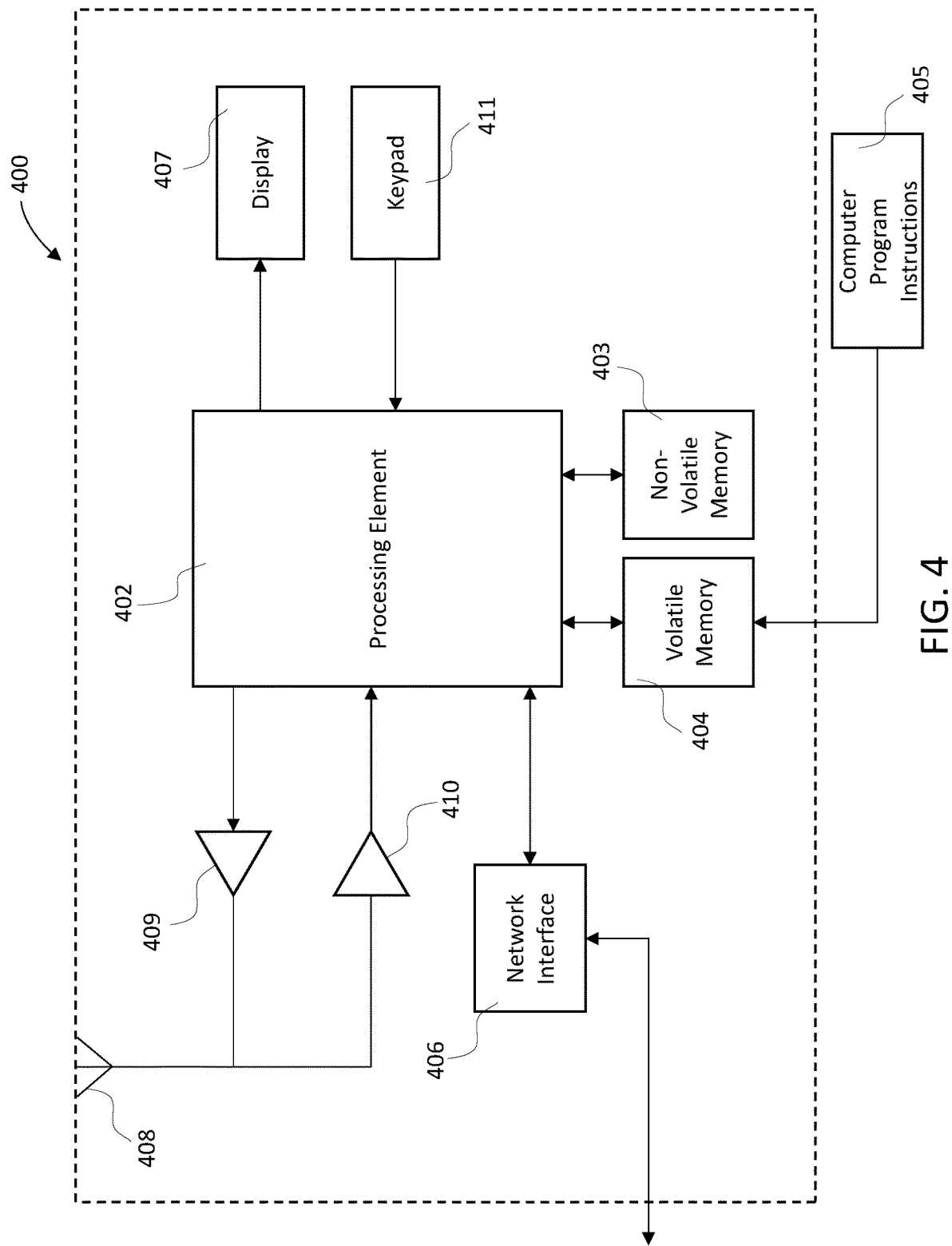
FIG. 4 provides a schematic of an example computing device configured to 3D print according to any of the approaches or methods of the present disclosure.

FIG. 4 provides an illustrative schematic representative of an external computing device 400 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The external computing device 400 can be operated by various parties. As shown in FIG. 4, the external computing device 400 can include an antenna 408, a transmitter 409 (e.g., radio), a receiver 410 (e.g., radio), and a processing element 402 (e.g., CPLDs, microprocessors, multi-core processors, coprocessing entities, ASIPs, microcontrollers, and/or controllers) that provides signals to and receives signals from the transmitter 409 and receiver 410, correspondingly.

The signals provided to and received from the transmitter 409 and the receiver 410, correspondingly, may include signaling information/data in accordance with air interface standards of applicable wireless systems. In this regard, the external computing device 400 may be capable of operating with one or more air interface standards, communication protocols, modulation types, and access types. More particularly, the external computing device 400 may operate in accordance with any of a number of wireless communication standards and protocols, such as those described above with regard to the computing device 30. In a particular embodiment, the external computing device 400 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing device 400 may operate in accordance with multiple wired communication standards and protocols, such as those described above with regard to the computing device 30 via a network interface 406.

Via these communication standards and protocols, the external computing device 400 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing device 400 can also download changes, add-ons, and updates, for instance, to its firmware, software (e.g., including executable instructions, applications, program modules), and operating system.

According to one embodiment, the external computing device 400 may include location determining aspects, devices, modules, functionalities, and/or similar words used herein interchangeably. For example, the external computing device 400 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating a position of the external computing device 400 in connection with a variety of other systems, including cellular towers, Wi-Fi access points, and/or the like. Similarly, the external computing device 400 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing device 400 may also comprise a user interface (that can include a display 407 coupled to the processing element 402) and/or a user input interface (coupled to the processing element 402). For example, the user interface may be a user application, browser, user interface, and/or similar words used herein interchangeably executing on and/or accessible via the external computing device 400 to interact with and/or cause display of information/data from the computing device 30, as described herein. The user input interface can comprise any of a number of devices or interfaces allowing the external computing device 400 to receive data, such as a keypad 411 (hard or soft), a touch display, voice/speech or motion interfaces, or other input device. In embodiments including a keypad 411, the keypad 411 can include (or cause display of) the conventional numeric (0-9) and related keys (#, *), and other keys used for operating the external computing device 400 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing device 400 can also include volatile storage or memory 404 and/or non-volatile storage or memory 403, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing device 400. As indicated, this may include a user application that is resident on the entity or accessible through a browser or other user interface for communicating with the computing device 30 and/or various other computing entities.

In another embodiment, the external computing device 400 may include one or more components or functionality that are the same or similar to those of the computing device 30, as described in greater detail above. As will be recognized, these architectures and descriptions are provided for exemplary or illustrative purposes only and are not meant to limit the scope of this disclosure to one, some, or all of the various embodiments described herein.

In some embodiments, the apparatus 20 can comprise the computing device 30, the computing device 30 suitable to carry out movement of the various components of the apparatus 20, flow rates or deposition/dispersal volumes, or the like. In some embodiments, the apparatus 20 or a component thereof, e.g., the computing device 30, can be configured to be in communication with the external computing device 400, which can be configured to provide instructions for printing, a design file for a printed article, printing nozzle and/or nebulizer path instructions, or the like to the computing device 30, which is configured to carry out printing.

Figure 5:
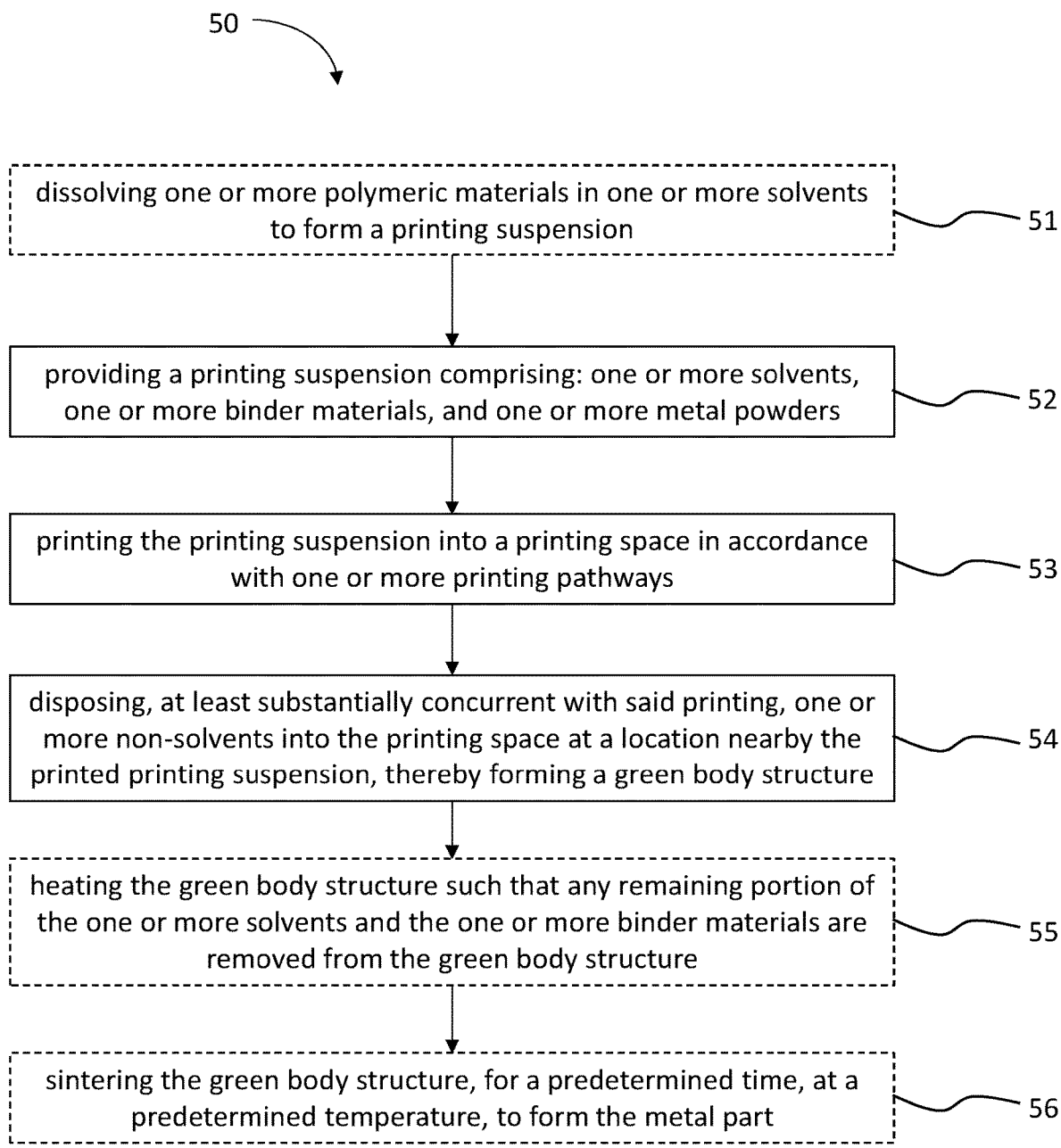
FIG. 5 provides a process flow diagram of a method of 3D printing metal articles, according to an embodiment of the present disclosure.

Referring now to FIG. 5, a method 50 for 3D printing of a metal article can comprise, optionally, dissolving one or more polymeric materials in one or more solvents to form a printing suspension, at 51. In some embodiments, the method 50 can further comprise providing a printing suspension comprising: one or more solvents, one or more binder materials, and one or more metal powders, at 52. In some embodiments, the method 50 can further comprise printing the printing suspension into a printing space in accordance with one or more printing pathways, at 53.

In some embodiments, the build material can be injected, spun, inserted, communicated, dropped, conveyed, or otherwise dispensed within the printing environment such that the coagulation agent can facilitate at least partial coagulation of the ink and formation of the green body structure. Regardless of the particular manner in which the build material is dispensed within the printing environment, the coagulation agent can cause sufficient coagulation of the printed ink by replacing the solvent in the ink and causing the deposited, at least partially coagulated build material (resulting from the solvent-exchanged ink) to be self-supporting, e.g., of layer-by-layer deposition. According to some embodiments, the intermediate article or finished article may be formed, according to the described approaches, free of printed support structures. Such support structures are used extensively across the array of conventional additive manufacturing and 3D printing techniques and are often required to be trimmed away after formation of the intermediate or finished article. By forming the intermediate article without printed supports, the methods described herein (e.g., the method 50) can eliminate the labor-intensive, costly, and time-consuming process step of trimming away the printed support structures once the article is fully formed.

In some embodiments, the one or more metal powders can comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, alloys, other metals and their alloys thereof, or combinations thereof.

In some embodiments, the one or more solvents can comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents or solvent mixtures, or combinations thereof. In some embodiments, the one or more solvents can comprise at least one from among: dimethyl sulfoxide (DMSO), dimethylformamide (DMF), acetonitrile, ethanol, variants thereof, combinations thereof, or the like.

In some embodiments, the one or more binder materials can comprise at least one from among: a wax, a polymer, a gel, a semi-solid, or a metal. In some embodiments, the one or more binder materials can comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or combinations thereof. In some embodiments, the one or more polymeric materials can comprise at least one from among: thermoplastic polymers, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or any combination thereof. In some embodiments, the solvent for dissolution of the polymeric material(s) can be or comprise any suitable solvent, such as a solvent or solvent mixture comprising one or more of: dimethylsulfoxide (DMSO), ethanol, N-methylpyrrolidone, cyclodextrin, a pluronic detergent, liposomes, acetonitrile, N,N-Dimethylformamide (DMF), sodium methylsulfinylmethylide, dimethylsulfide, dimethyl sulfone, acetone, dimethylformamide, dimethylacetamide, N-methyl-2-pyrrolidone, HMPA, methanol, isopropanol, tert-butanol, acetic acid, ether, tetrahydrofuran, dichloromethane, chloroform, triethylamine, pyridine, ethyl acetate, variants thereof, combinations thereof, or the like.

In some embodiments, the one or more non-solvents or coagulation agents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

In some embodiments, the method 50 can further comprise disposing, at least substantially concurrent with said printing, one or more non-solvents into the printing space at a location nearby the printed printing suspension, thereby forming a green body structure, at 54. In some embodiments, disposing can comprise spraying a nebulized coagulation agent within a predetermined distance of the disposed liquid build material to at least partially coagulate the liquid build material, thereby forming the green body structure. As described elsewhere herein, the nebulizing agent may comprise a non-solvent or any suitable material which initiates or accelerates coagulation of the polymer either by phase inversion, by solvent exchange with the disposed liquid build material, or by any other suitable mechanism.

In some embodiments, the method 50 can further comprise, optionally, heating the green body structure such that any remaining portion of the one or more solvents and the one or more binder materials are removed from the green body structure, at 55. In some embodiments, the method 50 can further comprise, optionally, sintering the green body structure, for a predetermined time, at a predetermined temperature, to form the metal part, at 56.

In some embodiments, some or all of the method 50 can be carried out using a system such as described hereinabove. In some embodiments, some or all of the method 50 can be carried out using an apparatus such as the apparatus 20. In some embodiments, some or all of the method 50 can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air. In some embodiments, some aspects of the process or functionality of the apparatus can be at least partially controlled by a computing device (e.g., 30 or 400), and/or the like.

Figure 6:
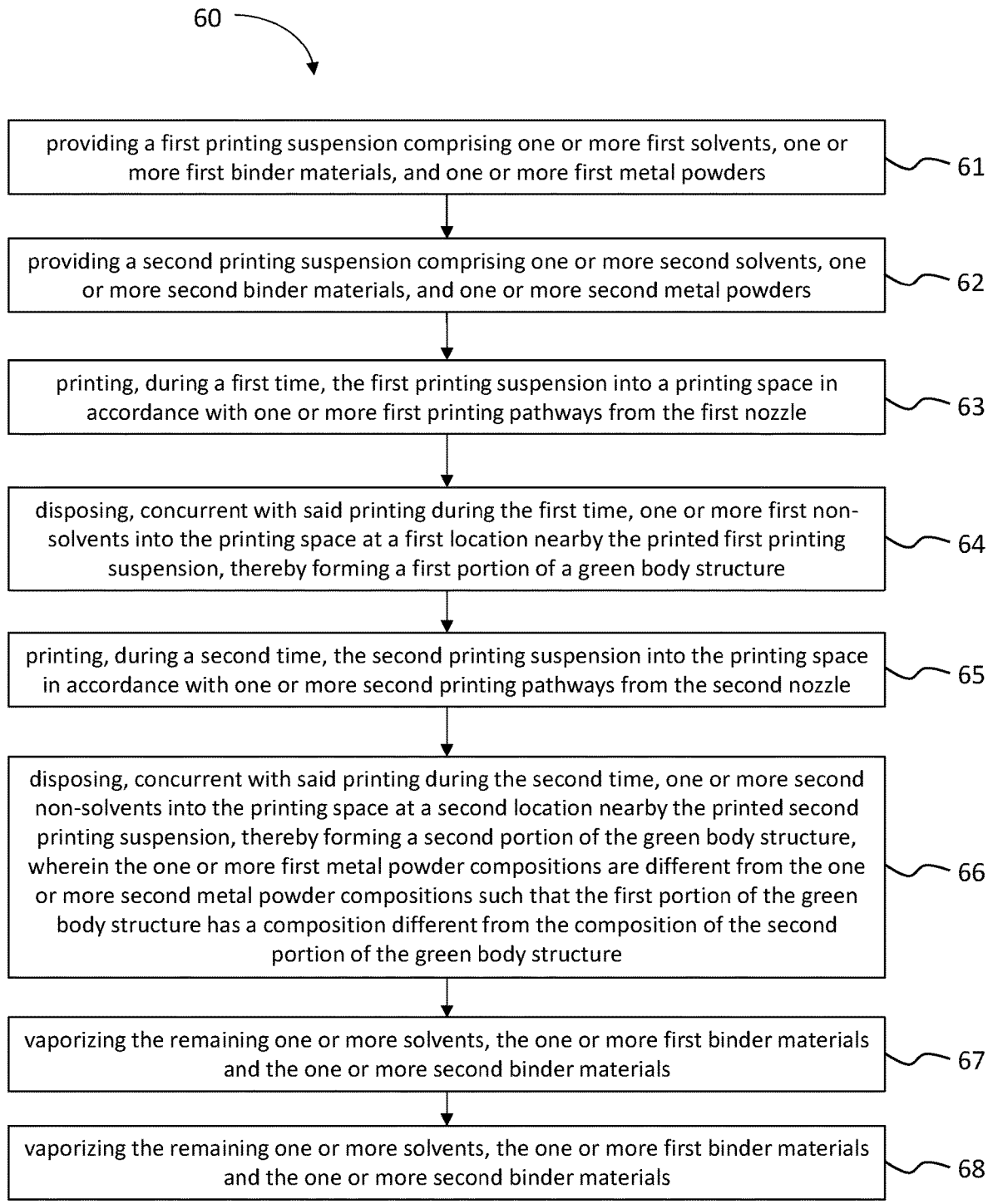
FIG. 6 provides a process flow diagram of a method of 3D printing metal articles, according to an embodiment of the present disclosure.

Referring now to FIG. 6, a method 60 for three-dimensional printing of a metal article can comprise providing a first printing suspension comprising one or more first solvents, one or more first binder materials, and one or more first metal powders, at 61. In some embodiments, the method 60 can further comprise providing a second printing suspension comprising one or more second solvents, one or more second binder materials, and one or more second metal powders, at 62. In some embodiments, the method 60 can further comprise printing, during a first time, the first printing suspension into a printing space in accordance with one or more first printing pathways from the first nozzle, at 63. In some embodiments, the method 60 can further comprise disposing, concurrent with said printing during the first time, one or more first non-solvents into the printing space at a first location nearby the printed first printing suspension, thereby forming a first portion of a green body structure, at 64. In some embodiments, the method 60 can further comprise printing, during a second time, the second printing suspension into the printing space in accordance with one or more second printing pathways from the second nozzle, at 65. In some embodiments, the method 60 can further comprise disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure, at 66. In some embodiments, the method 60 can further comprise vaporizing the remaining one or more solvents, the one or more first binder materials and the one or more second binder materials, at 67. In some embodiments, the method 60 can further comprise vaporizing the remaining one or more solvents, the one or more first binder materials and the one or more second binder materials, at 68.

In some embodiments, some or all of the method 60 can be carried out using a system such as described hereinabove. In some embodiments, some or all of the method 60 can be carried out using an apparatus such as the apparatus 20. In some embodiments, some or all of the method 60 can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air. In some embodiments, some aspects of the process or functionality of the apparatus can be at least partially controlled by a computing device (e.g., 30 or 400), and/or the like.

Figure 7:
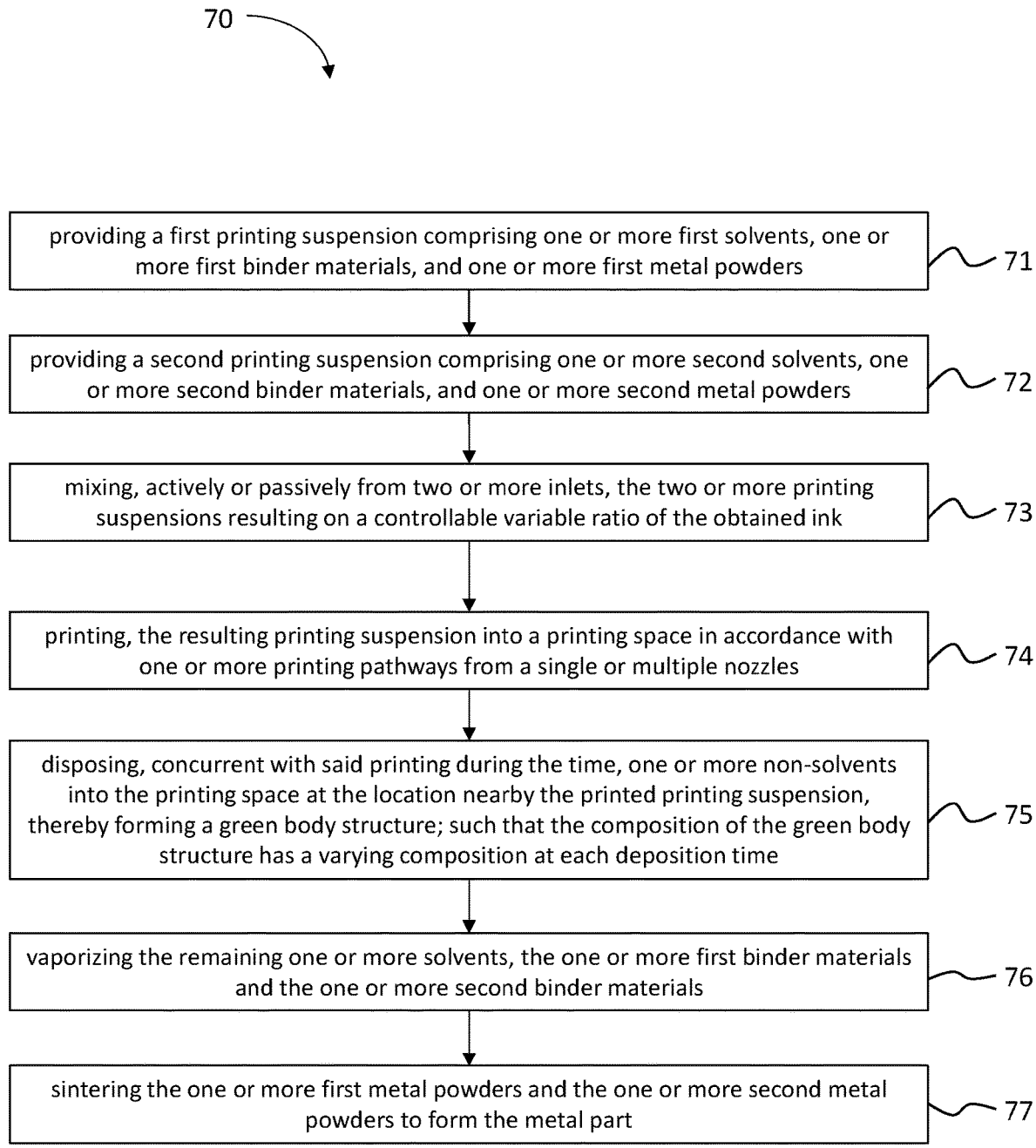
FIG. 7 provides a process flow diagram of a method of 3D printing metal articles, according to an embodiment of the present disclosure.

Referring now to FIG. 7, a method 70 for three-dimensional printing of a metal article can comprise providing a first printing suspension comprising one or more first solvents, one or more first binder materials, and one or more first metal powders, at 71. In some embodiments, the method 70 can further comprise providing a second printing suspension comprising one or more second solvents, one or more second binder materials, and one or more second metal powders, at 72. In some embodiments, the method 70 can further comprise mixing, actively or passively from two or more inlets, the two or more printing suspensions resulting on a controllable variable ratio of the obtained ink, at 73. In some embodiments, the method 70 can further comprise printing, the resulting printing suspension into a printing space in accordance with one or more printing pathways from a single or multiple nozzles, at 74. In some embodiments, the method 70 can further comprise disposing, concurrent with said printing during the time, one or more non-solvents into the printing space at the location nearby the printed printing suspension, thereby forming a green body structure; such that the composition of the green body structure has a varying composition at each deposition time, at 75. In some embodiments, the method 70 can further comprise vaporizing the remaining one or more solvents, the one or more first binder materials and the one or more second binder materials, at 76. In some embodiments, the method 70 can further comprise sintering the one or more first metal powders and the one or more second metal powders to form the metal part, at 76.

In some embodiments, some or all of the method 70 can be carried out using a system such as described hereinabove. In some embodiments, some or all of the method 70 can be carried out using an apparatus such as the apparatus 20. In some embodiments, some or all of the method 70 can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air. In some embodiments, some aspects of the process or functionality of the apparatus can be at least partially controlled by a computing device (e.g., 30 or 400), and/or the like.

Select Experimental Results

Figure 8:
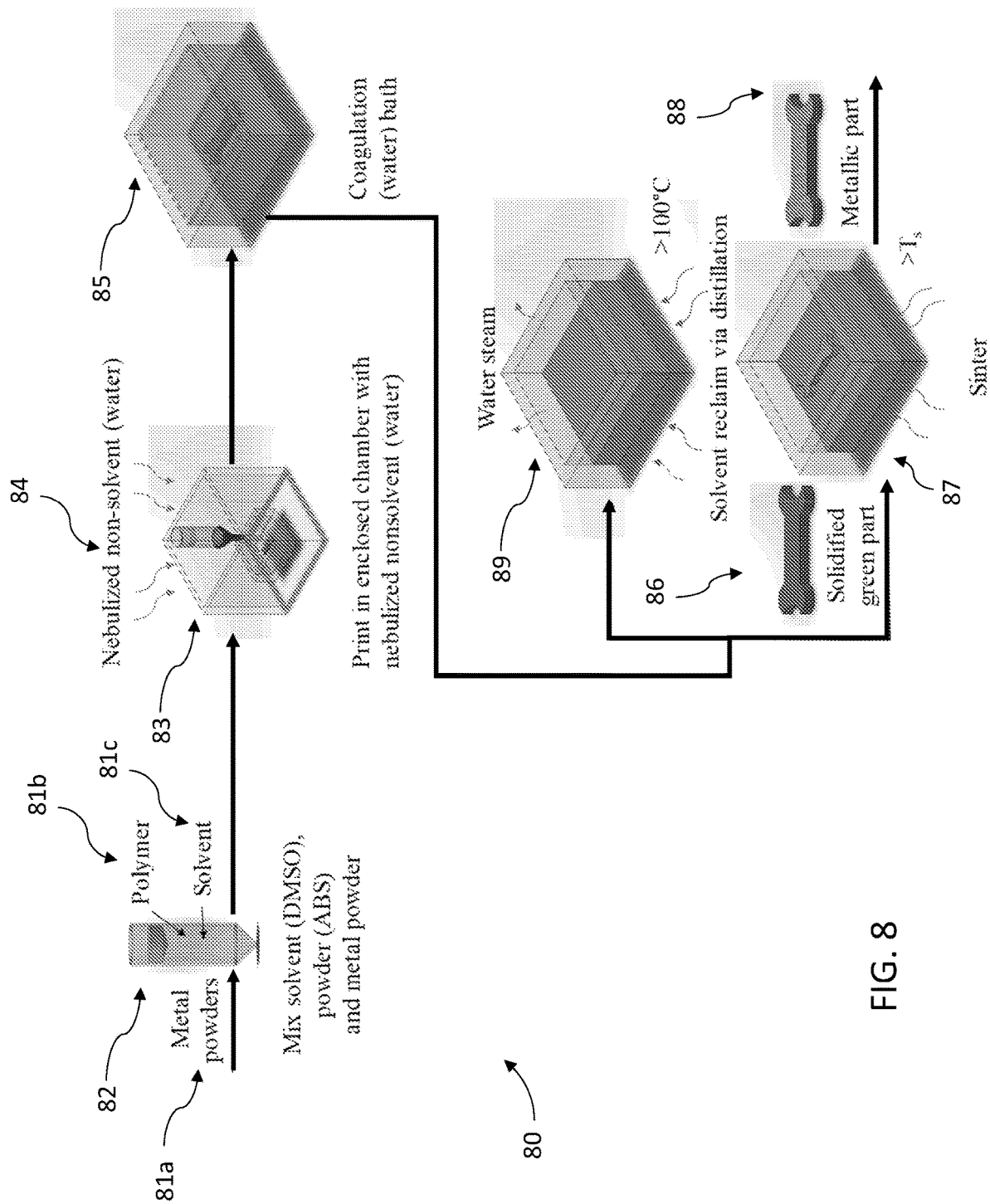
FIG. 8 provides a schematic of an example apparatus for 3D printing of a metal powder-containing build material directly in air, according to an embodiment of the present disclosure.

Referring now to FIG. 8, according to an embodiment, a process 80 is provided for solvent-assisted 3D printing of a metal powder-containing build material (e.g., "ink") in air at ambient temperature and pressure, without requiring melting of polymers in the build material, without requiring any concurrently printed supports, and without requiring the use of a liquid or semi-solid support bath material during printing.

According to some embodiments, the process 80 can comprise a mixing of metal powder 81a with a solution or dispersion comprising a polymer 81b and a solvent 81c in a reservoir 82, and printing, jetting, injecting, extruding or otherwise disposing the mixture in an enclosed printing chamber 83. In some embodiments, a nebulized non-solvent 84 or other suitable coagulation agent can be dispersed within the enclosed printing chamber 83 such that the mixture (e.g., build material) at least partially coagulates to form a green body structure. In some embodiments, in an instance in which the build material only partially coagulates, and further in an instance in which more extensive or full coagulation of the green body structure is needed for a particular article or application, the process 80 can further comprise a coagulation bath 85 into which the partially coagulated green body structure can be at least partially submerged. Other suitable approaches for further coagulating a partially coagulated green body structure include but are not limited to further spraying of nebulized non-solvent or another coagulant onto the green body structure, heating the green body structure, irradiating the green body structure, bombarding the green body structure with energy or an energetic or magnetic field, causing vaporization or evaporation of solvent from the green body structure, and/or the like.

In some embodiments, the process 80 can further comprise providing a solidified green body structure 86 to a sintering furnace 87 and causing thermal debinding and thermal sintering of the green body structure to form the finished metallic part 88. The process 80 can further comprise a recycling or reclaiming of solvent from the printing process using, e.g., evaporation/distillation or the like.

In some embodiments, the process 80 was used to print metal articles and parts using different single metal powders such as iron, nickel, copper, and silver. In some embodiments, a selected metal powder was used to print a metal part by mixing the metal powder with a solution prepared from a sacrificial polymer (e.g., acrylonitrile-butadiene-styrene (ABS)) and a solvent (e.g., dimethyl sulfoxide (DMSO)). The process 80 was carried out, according to some embodiments, by extrusion printing example polymer-metal composite parts in air using the resulting metal powder-polymer-solvent build materials.

According to one experimental example conducted metal powders of iron, nickel (Alfa Aesar, Ward Hill, MA, USA), and silver (Inframat Corporation, Manchester, CT, USA) were mixed with a solution of DMSO (Bioreagent grade, Fisher Scientific, Fair Lawn, NJ, USA) with 30-40% (w/v) ABS (ABSplus P430, Stratasys, Eden Prairie, MI, USA). The mixture was continuously stirred using a roller mixer (DLAB Scientific, Riverside, CA, USA). The ink was loaded in a disposable 5 mL syringe fitted with a stainless steel 23-gauge tip (Nordson EFD, Vilters, Switzerland). The syringe was assembled onto a Hyrel Engine SR (Hyrel3D, Norcross, GA, USA) with a CSD-5 dispensing head (ultraviolet array not used). G-code files were obtained by slicing the STL models using the embedded Slic3r utility in Hyrel's Repetrel software. Some parameters used were: a layer thickness of 0.05-0.15 mm and a path speed of 60-120 mm/min. Deionized water mist was supplied simultaneously as a non-solvent while printing using a nebulizer (Lumiscope, East Rutherford, NJ, USA) in order to induce partial solidification onto the structure being printed based on the vapor-induced phase inversion mechanism. An enclosed chamber was used to control the printing environment. The 3D printed part was immersed in 100 mL of a water-based coagulation bath for 1 hour to enhance the replacement of the solvent (DMSO) with non-solvent (water) and therefore fully solidify the printed metal-polymer composite part as a green part. This step is required to fully facilitate solvent extraction and thus, most of the solvent to be later reclaimed for its reuse. The printed part was dried at room temperature, and the process-induced solvent was reclaimed through a distillation process. Finally, a sintering cycle was applied to the solidified green parts to burn the ABS out (e.g., debind) and sinter the metal powders to form the finished metal part.

In many of the examples provided herein, ABS was used as a sacrificial binder polymer since extensive literature is available on the study of ABS under high temperatures, where the autoignition temperature of ABS is determined to be within the range of 466 and 575° C. depending on its molecular composition. However, many other polymeric materials are suitable and possible for use in the disclosed system, method, and approach. The toxicity of ABS induced by its thermal degradation is comparable to other common polymeric materials (e.g. cellulose and polyvinyl chloride (PVC)), and it is mainly related to the generation of carbon monoxide (CO) and hydrogen cyanide (HCN). Therefore, the thermal cycle applied to the 3D green parts was carried in an inert atmosphere and controlled exhaust system.

Example Printed Articles

One or more of the described processes 10, 80, or methods 50, 60, 70 (including parts or variations thereof) can be carried out for the fabrication of arbitrary parts in arbitrary orientations. In other words, the complexity, costliness, and time necessary to carry out fabrication is at least partially decoupled from the shape, dimensions, and complexity of the article being fabricated. The implications for practical applications are surprising and significant. Conversely, 3D printing a metal article, e.g., an article having high complexity, according to conventional processes requires a not insignificant amount of thought, time, and/or computing power be dedicated to the printing orientation of the part to maximize printing precision and minimize printing time, requires careful placement of printed support structures such that the printed article is sufficiently stabilized and such that the printed support structures are minimized, and requires time, labor, and therefore cost to trim away the support structures from the finished article, a process which sometimes damages the printed article such that the printed article must be scrapped. The 3D printing methods, e.g., the methods 50, 60, 70, described herein can eliminate the need for a particular orientation, are not rendered more time-consuming or costly with increasing article complexity, and do not require support structures to be printed concurrent to the printing of the article, meaning less 3D printing/build material is wasted and the printed support structure trimming step is eliminated completely. The advantages in terms of production cost and time for 3D printed articles, among other advantages associated with these methods, are clear.

By way of example only, some examples of 3D printed metal articles printed according to the process 80 and using the build material described above are illustrated in FIGS. 9A-12. Powder suspensions for 3D printing each example metal article were obtained by mixing between about 2 g and about 2.5 g of each metal powder with between about 4 g and about 6 g of a mixture of about 30% (w/v) ABS with DMSO, e.g., according to the process 80 described above. After a printed structure was fully solidified, the metal content of the metal-polymer composite part ranged from about 55% (w/w) up to about 65% (w/w).

In FIGS. 9A-9E, a printing sequence is illustrated using chronologically ordered photographs that capture the printing process at various points during the process of 3D printing of a thin-walled iron-based-ABS circular structure.

In FIG. 10, a hollow vase-like structure can be observed containing silver flakes. An iron-based square column and a nickel-based hollow construct with a variable cross-section, each printed according to the process 80, can also be seen in FIGS. 11 and 12, respectively.

In general, the printed parts closely match the original design, regardless of the build material. For each build material, metal powder/binder/solvent concentrations, coagulant choice and concentration, post-printing solidification bath materials, and print parameters were optimized for best results; material details are discussed in more detail elsewhere herein. Wall thickness of, for example, the printed circular structure illustrated in FIGS. 9A-9E was on the order of between about 100 μm and about 500 μm, inclusive of all values and ranges therebetween. In some embodiments, the wall thickness of a hollow printed article and/or other dimensions can be reduced by reducing the size or bore of the printing nozzle.

In some embodiments, the described process may require less high energy delivery systems for 3D green part printing. In some embodiments, such a high energy is usually indispensable but prohibitive but not needed for the disclosed process. In some embodiments, the disclosed processes and methods, and associated systems and apparatuses, may present less safety concerns to a user as compared to conventional processes such as the powder bed fusion process (e.g., which presents significant fire and inhalation hazards). In some embodiments, all of a metal powder used in the build material is utilized for part printing, and there is no powder waste, in contrast to the conventional powder bed fusion process which results in significant metal waste and/or requires costly and energy inefficient reclamation/recycling processes. In some embodiments, metallic structures with a heterogeneous composition can be easily obtained using the disclosed approaches and methods by selectively mixing two or more different powder inks prior to deposition. While attempts to obtain multi-metal 3D printed parts have been performed by gradually increasing and decreasing the metal powder amount during directed energy deposition processes such as laser metal deposition, the printable material composition is limited by the thermally activated phase change, which might lead to brittle phases during the printing process.

As such, there are many advantages to using the disclosed binder-based metallic green part printing and sintering process, especially when compared with other binder-based processes. For instance, when compared to binder jetting processes, the disclosed processes and methods does not produce any waste of powders during the green part printing phase whereas the binder jetting process does product powder waste. In addition, the disclosed processes and methods do not require any particular size or form of raw polymer materials, and there is no need for a pre-heating process prior to deposition/printing, which distinguishes the disclosed processes and methods from, e.g., the bound powder extrusion process which requires a pre-heating process. Furthermore, according to some embodiments, disclosed processes and methods may use an active phase inversion-based solidification mechanism whereas other liquid powder ink extrusion approaches rely on a passive green part solidification approach such as solvent evaporation, which is disadvantageous. Specifically, according to some embodiments, the phase inversion process may facilitate, promote, or enable the printing of self-supporting structures from a binder/metal powder build material, which can be actively and accurately managed by controlling the delivery of non-solvent to sacrificial binder materials.

The described processes and methods may be applied to, among other things: (i) print metal structures from any powders with a wide range of size, chemical composition, and/or environmental sensitivity such as humidity; (ii) print homogeneous and heterogeneous metallic structures in air; (iii) print meta-material structures; (iv) print multi-material structures from different materials including metals, ceramics, polymers, composites, and/or biomaterials; and (v) print porous metal structures for applications where mass flow through a part is required (e.g., filters, heat exchangers, biomedical implants, etc.).

Conclusions

A three-dimensional (3D) printing method and associated apparatus are disclosed for fabrication of 3D printed metal structures and articles. In some embodiments, the fabrication may be freeform or additive fabrication. In some embodiments, the 3D printed structures and articles may be formed from a build material, such as a build material comprising one or more metal powders, one or more polymeric materials, and one or more solvents. In some embodiments, at least partial solidification of the build material after printing can be facilitated with one or more coagulation agents, such as a non-solvent material or the like. In some embodiments, the at least partially solidified article containing metallic powders can be referred to as a green body structure, and may, optionally, be fully solidified by submerging the green body structure in to a coagulation bath or by other means of exposing the green body structure to one or more coagulation agents or the like. In some embodiments, the green body structure can be heated to remove some or all of the one or more polymeric materials, some or all of the one or more solvents, and/or other materials, impurities, and/or contaminants from the green body structure. In some embodiments, the green body structure can be sintered at one or more temperatures or over a temperature gradient, for a period of time, e.g., in accordance with the sintering properties of the particular one or more metal powders in the green body structure.

In some embodiments, 3D printed structures and articles may be fabricated under ambient conditions and/or without the use of printed support structures which would need to be removed after 3D printing in order to achieve the finished structure or article. In some embodiments, a build material can be generated by combining one or more polymers and one or more solvents, such as by dissolved the one or more polymers in the one or more solvents, and adding the one or more metal powders. In some embodiments, the build material can be referred to as "the ink," "the printing material," or the like. In some embodiments, the build material can be disposed within a printing volume or onto a printing platform without the use of supports or other structures being previously, concurrently, or subsequently printed to support the build material while the build material solidifies or partially solidifies. In some embodiments, freeform printing can be carried out at ambient temperature and pressure. In some embodiments, just previous to, concurrent with, or just following the disposition of the build material into the printing volume or onto the printing platform, a volume of one or more coagulation agents, such as a coagulant, a non-solvent, variations thereof, or combinations thereof, can be disposed, such as by an aerosol sprayer or other suitable dispensing mechanism, to a volume directly adjacent the disposed build material. Without wishing to be bound by any particular theory, the one or more coagulation agents can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or other suitable changes to the one or more polymeric materials, thus forming a green body structure. As such, in some embodiments, a first volume of the build material can be printed, e.g., by a nozzle or the like, in a freeform manner directly into air and the one or more polymeric materials can be partially or fully solidified by disposing a first volume of the one or more coagulation agents sufficiently close by the printed first volume of the build material. In some embodiments, the nozzle can then be moved a distance, in one or more directions within the printing volume or across the printing platform, from the previous printing location, and the nozzle can be used to print a second volume of the build material, e.g., adjacent the first volume of the build material which is now partially or fully solidified. In some embodiments, a second volume of the coagulation agent can be disposed nearby the second volume of printed build material to partially or fully solidify the second volume of build material. In some embodiments, such a method or approach can be continued along a predetermined path of travel by the nozzle through the printing volume or across the printing platform in order to completely print the green body structure without being required to melt the one or more polymeric materials in the build material and allow them to solidify once printed, without using support structures, and/or without using a support bath or the like to maintain the structure of the printed article prior to completion of printing of the article. In some embodiments, the green body structure may be one in which some or all of the one or more polymeric materials are only partially solidified or for which further processing is helpful or required to achieve the fully solidified or fully coagulated green body structure in which some, most, or all of the one or more solvents are removed and/or in which some, most, or all of the one or more polymeric materials are solidified or coagulated. In some embodiments, the green body structure, once the one or more polymeric materials are fully or substantially fully coagulated and solidified, can be heated to remove some or all of the one or more solvents and/or some or all of the one or more polymeric materials. In some embodiments, heating can comprise heating the green body structure at a particular rate, from a first particular temperature (e.g., ambient or room temperature) to a second particular temperature (e.g., at which the one or more solvents are vaporized). In some embodiments, the green body structure can then be sintered in order to remove some or all of the one or more polymeric materials and cause inter-particle fusing of the one or more metal powders, thereby forming the finished metal article.

In some embodiments, a method for three-dimensional printing of a metal article can comprise: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the one or more non-solvents are operable to extract at least a portion of the one or more solvents from the green body structure. In some embodiments, once at least the portion of the one or more solvents are extracted from the green body structure, the one or more binder materials become at least partially solidified such that the green body structure experiences substantially no deformation, at a temperature, a pressure, and a humidity, over a period of time. In some embodiments, the one or more binder materials comprise one or more polymers that are configured to undergo a phase inversion in the presence of the one or more non-solvents. In some embodiments, the method can further comprise, in an instance in which only the portion of the one or more solvents are extracted from the green body structure such that the one or more binder materials become only partially solidified, disposing the green body structure into a coagulation bath to extract a remainder of the one or more solvents from the green body structure, thereby causing substantially complete solidification of the one or more binder materials. In some embodiments, the method can further comprise: heating the green body structure such that any remaining portion of the one or more solvents and the one or more binder materials are removed from the green body structure. In some embodiments, the heating causes at least partial vaporization of at least one of the remaining portion of the one or more solvents and the one or more binder materials. In some embodiments, the heating comprises sintering the green body structure, for a predetermined time, at a predetermined temperature, to form the metal part. In some embodiments, the printing is carried out using one or more printing nozzles. In some embodiments, the printing comprises an additive manufacturing process. In some embodiments, the method further comprises: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, the printing comprises printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the one or more binder materials have a volatilization temperature less than a sintering temperature of the one or more metal powders. In some embodiments, the printing is done at a first temperature substantially equivalent to room temperature. In some embodiments, the method can further comprise: vaporizing the one or more binder materials at a second temperature greater than the first temperature; and sintering the one or more metal powders at a third temperature greater than the second temperature. In some embodiments, the one or more metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, variants thereof, alloys thereof, or combinations thereof. In some embodiments, the one or more solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents or solvent mixtures, or combinations thereof. In some embodiments, the one or more binder materials may comprise at least one from among: a wax, a polymer, a gel, a semi-solid, or a metal. In some embodiments, the one or more binder materials comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), other polymers, copolymers thereof, variants thereof, or combinations thereof. In some embodiments, the one or more non-solvents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

In some embodiments, a method is provided for three-dimensional (3D) printing of a metal part, the method comprising: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways from the first nozzle; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways from the second nozzle; disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure; vaporizing the remaining one or more solvents, the one or more first binder materials and the one or more second binder materials; and sintering the one or more first metal powders and the one or more second metal powders to form the metal part.

In some embodiments, a method is provided for three-dimensional (3D) printing of a metal part, the method comprising: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part.

In some embodiments, a method can comprise, optionally, dissolving one or more polymeric materials in one or more solvents to form an intermediate build material, and then dispersing or otherwise disposing one or more metal powders into the intermediate build material to form a build material (also called herein "the liquid build material," "the ink,", "the printing material," or "the printing suspension"). In some embodiments, the build material can comprise any suitable polymeric material such as a thermoplastic. In some embodiments, the one or more polymeric materials can be dissolved or dispersed in the one or more solvents, which can comprise any suitable solvent, e.g., based upon the interaction/dissolution chemistry of the one or more polymeric materials and the chosen one or more solvents. In some embodiments, such a solvent can comprise dimethyl sulfoxide (DMSO), and/or the like. In some embodiments, to form the build material, the one or more polymeric materials can be dissolved in the one or more solvents partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the one or more polymeric materials without causing molecular degradation or a reduction in the degree of polymerization (DP). The build material can further be formed by dispersing or disposing one or more metal powders in the polymer/solvent solution. In some embodiments, the room temperature process for forming the build material, according to some embodiments described herein, may require little or no heating of the printing materials, may result in little or no thermal deterioration of the polymers, and can reduce or eliminate the need for heating and/or melting the one or more polymeric materials before printing the green body structure.

According to another embodiment, an apparatus can be provided for 3D printing a metal article. In some embodiments, the apparatus can comprise: a printing space comprising an air-filled inner volume and a printing substrate; a reservoir configured to contain a supply of a liquid build material; a nozzle coupled to the reservoir and configured to dispose a volume of the liquid build material into the air-filled inner volume of the printing space; a nebulizer configured to nebulize a coagulation agent and disperse the nebulized coagulation agent within a predetermined distance of the disposed volume of liquid build material to at least partially coagulate the disposed volume of liquid build material; and a computing device configured to control movement of the nozzle and the disposing of the volume of the liquid build material into the air-filled inner volume of the printing space. In some embodiments, the nebulized coagulation agent may only partially coagulate the disposed volume of liquid build material to form an intermediate article. As such, in some embodiments, the apparatus can further comprise, optionally, a solidification bath comprising a coagulation solution, the solidification bath configured to, in an instance in which the nebulized coagulation agent only partially coagulates the disposed volume of liquid build material, receive the intermediate article and cause, via the coagulation fluid, the intermediate article to fully solidify, thereby forming the finished article.

According to an embodiment, a method can be carried out that comprises: disposing a printing material into a printing space according to a form factor associated with an article, the printing material comprising a plurality of metal particles, a binder material, and a solvent; and disposing a non-solvent into the printing space, thereby causing selective binding at least a portion of said printing material together to maintain said form factor of said article. In some embodiments, the printing material and the non-solvent are disposed into the printing space during a first time. In some embodiments, the method can further comprise: during a second time following the first time, heating said printing material to about a first temperature. In some embodiments, once the printing material is heated to said first temperature, a portion of at least one of the solvent, the non-solvent, or the binder volatilizes, forming a green body structure. In some embodiments, the method can further comprise: during a third time following the second time, heating said printing material to about a second temperature, the second temperature being higher than the first temperature. In some embodiments, once the printing material is heated to said second temperature, the green body structure sinters, forming the article.

According to another embodiment, an apparatus can be provided that comprises: means, such as a processor, a memory storing computer instructions, additive manufacturing equipment, a reservoir for storing build material or the like, one or more printing nozzles, a nebulizer, a printing volume, and/or the like. In some embodiments, the apparatus can comprise: means for disposing a printing material into a printing space according to a form factor associated with an article, the printing material comprising a plurality of metal particles, a binder material, and a solvent; and means for disposing a non-solvent into the printing space, thereby causing selective binding at least a portion of said printing material together to maintain said form factor of said article. In some embodiments, the printing material and the non-solvent are disposed into the printing space during a first time. In some embodiments, the apparatus can further comprise: means for, during a second time following the first time, heating said printing material to about a first temperature. In some embodiments, once the printing material is heated to said first temperature, a portion of at least one of the solvent, the non-solvent, or the binder volatilizes, forming a green body structure. In some embodiments, the apparatus can further comprise: means for, during a third time following the second time, heating said printing material to about a second temperature, the second temperature being higher than the first temperature. In some embodiments, once the printing material is heated to said second temperature, the green body structure sinters, forming a finished metal article.

According to yet another embodiment, a method for three-dimensional (3D) printing a metal part can be carried out, the method comprising: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the one or more non-solvents are operable to extract at least a portion of the one or more solvents from the green body structure. In some embodiments, once at least the portion of the one or more solvents are extracted from the green body structure, the one or more binder materials become at least partially solidified such that the green body structure experiences substantially no deformation, at a temperature, a pressure, and a humidity, over a period of time. In some embodiments, the one or more binder materials comprise one or more polymers that are configured to undergo a phase inversion in the presence of the one or more non-solvents. In some embodiments, the method can further comprise: in an instance in which only the portion of the one or more solvents are extracted from the green body structure such that the one or more binder materials become only partially solidified, disposing the green body structure into a coagulation bath to extract a remainder of the one or more solvents from the green body structure, thereby causing substantially complete solidification of the one or more binder materials. In some embodiments, the method can further comprise: heating the green body structure such that any remaining portion of the one or more solvents and the one or more binder materials are removed from the green body structure. In some embodiments, said heating causes at least partial vaporization of at least one of the remaining portion of the one or more solvents and the one or more binder materials. In some embodiments, said heating comprises sintering the green body structure, for a predetermined time, at a predetermined temperature, to form the metal part. In some embodiments, said printing is carried out using one or more printing nozzles. In some embodiments, said printing comprises an additive manufacturing process. In some embodiments, the method can further comprise: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, said printing comprises printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the one or more binder materials have a volatilization temperature less than a sintering temperature of the one or more metal powders. In some embodiments, said printing is done at a first temperature substantially equivalent to room temperature, the method further comprising: vaporizing the one or more binder materials at a second temperature greater than the first temperature; and sintering the one or more metal powders at a third temperature greater than the second temperature. In some embodiments, the one or more metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, alloys thereof, variants thereof, or combinations thereof. In some embodiments, the one or more solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents, variants thereof, mixtures thereof, or combinations thereof. In some embodiments, the one or more binder materials may comprise at least one from among: a wax, a polymer, a gel, a semi-solid, or a metal. In some embodiments, the one or more binder materials may comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), variants thereof, copolymers thereof, or combinations thereof. In some embodiments, the one or more non-solvents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

According to still another embodiment, a method for three-dimensional (3D) metal printing can be carried out, the method comprising: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways; and disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure. In some embodiments, the method can further comprise: vaporizing the remaining one or more solvents, the one or more first binder materials and the one or more second binder materials. In some embodiments, the method can further comprise: sintering the one or more first metal powders and the one or more second metal powders to form a metal part, said metal part having a form factor substantially similar to that of the green body structure. In some embodiments, at least one of the one or more first metal powders and the one or more second metal powders may comprise at least one from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, zirconium, other metals or metalloids, alloys thereof, variants thereof, or combinations thereof. In some embodiments, at least one of the one or more first solvents or the one or more second solvents may comprise at least one from among: dimethyl sulfoxide, dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, trichloroethylene, other applicable solvents, mixtures thereof, or combinations thereof. In some embodiments, at least one of the one or more first binder materials or the one or more second binder materials may comprise at least one from among: a wax, a polymer, a gel, a semi-solid, or a metal. In some embodiments, at least one of the one or more first binder materials or the one or more second binder materials may comprise at least one from among: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), copolymers thereof, variants thereof, or combinations thereof. In some embodiments, at least one of the one or more first non-solvents or the one or more second non-solvents may comprise one or more of: water, deionized water, water vapor, steam, water droplets, water having a miscible solvent dissolved therein, a non-solvent having a mutual miscibility with the chosen one or more solvents that satisfies a predetermined miscibility threshold, variants thereof, or combinations thereof.

According to yet another embodiment, a method for three-dimensional (3D) printing of a metal part can be carried out, the method comprising: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part.

According to another embodiment, an apparatus for three-dimensional (3D) printing a metal part can be provided, the apparatus comprising: means, such as at least one processor and at least one memory comprising program instructions, the at least one memory and the program instructions being configured to, with the at least one processor, cause at least the following: providing a printing suspension comprising: one or more solvents, one or more binder materials, and one or more metal powders; printing the printing suspension into a printing space in accordance with one or more printing pathways; and disposing, concurrent with said printing, one or more non-solvents into the printing space at a location nearby the printed printing suspension, thereby forming a green body structure having dimensions that are within a predetermined range of the dimensions of the metal part. In some embodiments, the at least one memory and the program instructions are further configured to, with the at least one processor, cause at least the following: heating the green body structure such that any remaining portion of the one or more solvents and the one or more binder materials are removed from the green body structure. In some embodiments, the apparatus can further comprise: one or more printing nozzles, wherein the at least one memory and the program instructions are further configured to, with the at least one processor, cause said printing using said one or more printing nozzles. In some embodiments, the at least one memory and the program instructions are further configured to, with the at least one processor, cause at least the following: providing a first material comprising the one or more solvents; disposing the one or more binder materials into the first material, causing the one or more binder materials to at least partially dissolve, and thereby forming a second material; and dispersing the one or more metal powders into the second material to form the printing suspension. In some embodiments, the at least one memory and the program instructions are further configured to, with the at least one processor, cause at least the following: printing, using one or more nozzles, the printing suspension into the printing space at a first rate, wherein said disposing the one or more non-solvents comprises disposing the one or more non-solvents, at a second rate controlled according to the first rate of said printing of the printing suspension, nearby the one or more nozzles such that the one or more non-solvents are disposed sufficiently nearby the printing suspension as it is printed from the one or more nozzles. In some embodiments, the at least one memory and the program instructions are further configured to, with the at least one processor, cause at least the following: vaporizing the one or more binder materials at a second temperature greater than the first temperature; and sintering the one or more metal powders at a third temperature greater than the second temperature, wherein said printing is carried out at a temperature substantially equivalent to room temperature.

According to still another embodiment, an apparatus can be provided for three-dimensional (3D) printing a metal part, the apparatus comprising: at least one processor; and at least one memory comprising program instructions, the at least one memory and the program instructions being configured to, with the at least one processor, cause at least the following: providing a first printing suspension comprising one or more first solvents, one or more first binder materials, and one or more first metal powders; providing a second printing suspension comprising one or more second solvents, one or more second binder materials, and one or more second metal powders; printing, during a first time, the first printing suspension into a printing space in accordance with one or more first printing pathways; disposing, concurrent with said printing during the first time, one or more first non-solvents into the printing space at a first location nearby the printed first printing suspension, thereby forming a first portion of a green body structure; printing, during a second time, the second printing suspension into the printing space in accordance with one or more second printing pathways; and disposing, concurrent with said printing during the second time, one or more second non-solvents into the printing space at a second location nearby the printed second printing suspension, thereby forming a second portion of the green body structure, wherein the one or more first metal powder compositions are different from the one or more second metal powder compositions such that the first portion of the green body structure has a composition different from the composition of the second portion of the green body structure. In some embodiments, the at least one memory and the program instructions are further configured to, with the at least one processor, cause at least the following: heating the green body structure such that any remaining portion of the one or more solvents and the one or more binder materials are removed from the green body structure. In some embodiments, the at least one memory and the program instructions are further configured to, with the at least one processor, cause at least the following: sintering the green body structure, for a predetermined time, at a predetermined temperature, to form the metal part. In some embodiments, the apparatus can further comprise: a first printing nozzle; and a second printing nozzle, wherein the at least one memory and the program instructions are further configured to, with the at least one processor, cause at least the following: printing, during said first time, the first printing suspension into the printing space in accordance with the one or more first printing pathways from the first nozzle; and printing, during said second time, the second printing suspension into the printing space in accordance with the one or more second printing pathways from the second nozzle. In some embodiments, said printing is done at a first temperature substantially equivalent to room temperature, wherein the at least one memory and the program instructions are further configured to, with the at least one processor, cause at least the following: vaporizing the one or more binder materials at a second temperature greater than the first temperature; and sintering the one or more metal powders at a third temperature greater than the second temperature.

According to still another embodiment, an apparatus can be provided for three-dimensional (3D) printing a metal part, the apparatus comprising: at least one processor; and at least one memory comprising program instructions, the at least one memory and the program instructions being configured to, with the at least one processor, cause at least the following: providing a first printing suspension comprising one or more first solvents, one or more first binder materials, and one or more first metal powders; providing a second printing suspension comprising one or more second solvents, one or more second binder materials, and one or more second metal powders; mixing, actively or passively from two or more inlets, the two or more printing suspensions resulting on a controllable variable ratio of the obtained ink; printing, the resulting printing suspension into a printing space in accordance with one or more printing pathways from a single or multiple nozzles; disposing, concurrent with said printing during the time, one or more non-solvents into the printing space at the location nearby the printed printing suspension, thereby forming a green body structure; such that the composition of the green body structure has a varying composition at each deposition time; vaporizing the remaining one or more solvents, the one or more first binder materials and the one or more second binder materials; and sintering the one or more first metal powders and the one or more second metal powders to form the metal part. In some embodiments, said printing is done at a first temperature substantially equivalent to room temperature, wherein the at least one memory and the program instructions are further configured to, with the at least one processor, cause at least the following: vaporizing the one or more binder materials at a second temperature greater than the first temperature; and sintering the one or more metal powders at a third temperature greater than the second temperature.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

In some embodiments, one or more of the operations, steps, elements, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, inserting, communicating, and other such terms of art are not to be construed as limiting the element to any particular means or method or apparatus or system, and is taken to mean conveying the material within the receiving vessel, solution, conduit, or the like by way of any suitable method.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

The various portions of the present disclosure, such as the Background, Summary, Brief Description of the Drawings, and Abstract sections, are provided to comply with requirements of the MPEP and are not to be considered an admission of prior art or a suggestion that any portion or part of the disclosure constitutes common general knowledge in any country in the world. The present disclosure is provided as a discussion of the inventor's own work and improvements based on the inventor's own work. See, e.g., *Riverwood Int'l Corp.* v. *R.A. Jones & Co.*, 324 F.3d 1346, 1354 (Fed. Cir. 2003).

In some embodiments, one or more of the operations, steps, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

Although specific advantages have been enumerated above, various embodiments may include some, none, or all of the enumerated advantages.

Other technical advantages may become readily apparent to one of ordinary skill in the art after review of the following figures and description.

It should be understood that, although exemplary embodiments are illustrated in the figures and described below, the principles of the present disclosure may be implemented using any number of techniques, whether currently known or not. The present disclosure should in no way be limited to the examples, experimental results, exemplary embodiments, preferred configurations, illustrated equipment, disclosed processes, or particular implementations and techniques illustrated in the drawings and described below.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, conveying, inserting, communicating, and other such terms of art are not to be construed as limiting the element to any particular means or method or apparatus or system, and is taken to mean conveying the material within the receiving vessel, solution, conduit, or the like by way of any suitable method.

Unless otherwise indicated, all numbers expressing quantities of equipment, number of steps, material quantities, material masses, material volumes, operating conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally, the term "about," as used herein when referring to a measurable value such as an amount of weight, time, volume, ratio, temperature, etc., is meant to encompass±10% of the stated value. For example, a value of "1,000," which would be construed from above as meaning "about 1,000," indicates a range of values from 900 to 1,100, inclusive of all values and ranges therebetween. As another example, a value of "about 1,000" should be taken to indicate any single value or sub-range of values from 900 to 1,100, inclusive of the values 900 and/or 1,100. As such, if a value of "about 1,000" is disclosed or claimed, this disclosure or claim element includes, for example, the value of 900, the value of 900.0000000000001, the value of 900.1, the value of 901, . . . the value of 1,000, . . . the value of 1,099.9999999, the value of 1,100, and all values, ranges, sub-ranges, therebetween including values interstitial to adjacent integers or whole numbers, to any decimal place.

Generally, the term "substantially," as used herein when referring to a measurable value, is meant to encompass±10% of the stated value. Generally, the term "substantially," as used herein with regard to a discrete position or orientation of a piece of equipment, component, or subcomponent, is meant to encompass the discrete position±10% of the discrete position. Generally, the term "substantially," as used herein with regard to a location of a piece of equipment, component, or subcomponent along a total range of travel of that equipment, component, or subcomponent, is meant to encompass±10% of the location of the equipment, component, or subcomponent with regard to the total range of travel of that piece of equipment, component, or subcomponent, including translational travel, rotational travel, and extending travel in any direction, orientation, or configuration. As such, the use of the phrase "substantially disposed within a container" would be construed from above as meaning that greater than or equal to 90% of the subject element is disposed within the container. Likewise, the use of the phrase "substantially positioned within a bath" would be construed from above as meaning that greater than or equal to 90% of the subject element is positioned within the bath.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Conventional terms in the fields of additive manufacturing, materials science, and chemistry have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that some or all of the parameters, dimensions, materials, equipment, processes, methods, and configurations described herein are meant to be preferred examples and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein "at. %" refers to atomic percent, "vol. %" refers to volume percent, and "wt. %" refers to weight percent. However, in certain embodiments when "at. %" is utilized, the values described may also describe "vol. %" and/or "wt. %," when "vol. %" is utilized, the values described may also describe "at. %" and/or "wt. %," and when "wt. %" is utilized, the values described may also describe "at. %" and/or "vol. %." For example, if "20 at. %" is described in one embodiment, in other embodiments the same description may refer to "20 wt. %" or "20 vol. %." As a result, all "at. %" values should be understood to also refer to "wt. %" in some instances and "vol. %" in other instances, all "vol. %" values should be understood to also refer to "wt. %" values in some instances and "at. %" in other instances, and all "wt. %" values should be understood to refer to "at. %" in some instances and "vol. %" in other instances.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method comprising:
  disposing a printing material into a printing space according to a form factor associated with an article, the printing material comprising a plurality of metal particles, a binder material, and a non-aqueous solvent;
  disposing a selective binding-enabling material into the printing space, thereby causing selective binding together of at least a portion of the printing material to maintain the printing material in the form factor, the selective binding-enabling material comprising one or more of: water, deionized water, water vapor, water having a miscible solvent dissolved therein, or a non-solvent having a mutual miscibility with the non-aqueous solvent that satisfies a predetermined miscibility threshold;
  after disposing the printing material and the selective binding-enabling material into the printing space, heating the printing space to about a first temperature such that at least a portion of at least one of the non-aqueous solvent, the selective binding-enabling material, or the binder material volatilizes, forming a green body structure; and
  heating the printing space to about a second temperature higher than the first temperature such that the green body structure sinters, forming the article.

2. The method of claim 1, wherein the plurality of metal particles comprise one or more from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, or zirconium.

3. The method of claim 1, wherein the non-aqueous solvent comprises one or more of: dimethyl sulfoxide (DMSO), dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, or trichloroethylene.

4. The method of claim 1, wherein the binder material comprises one or more of: a wax, a polymer, a gel, a semi-solid, or a metal.

5. A method comprising:
  forming a green body structure having dimensions and a form factor associated with a digital design for a printed article, wherein forming the green body structure comprises:
    preparing a print feedstock comprising metal particles, a binder material, and a non-aqueous solvent;
    on a printing platform, forming an intermediary structure from the print feedstock;
    contacting the intermediary structure with a selective binding-enabling material to cause selective binding of at least a portion of the print feedstock to form the green body structure, the selective binding-enabling material comprising one or more of: water, deionized water, water vapor, water having a miscible solvent dissolved therein, or a non-solvent having a mutual miscibility with the non-aqueous solvent that satisfies a predetermined miscibility threshold; and
    debinding the green body structure at about a first temperature to remove at least a portion of one of: the non-aqueous solvent, the selective binding-enabling material, the or the binder volatilizes, thereby forming the green body structure, wherein
  the method further comprises:
    heating the green body structure to about a second temperature higher than the first temperature such that the green body structure sinters, forming the printed article.

6. The method of claim 5, wherein the metal particles comprise one or more from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, or zirconium.

7. The method of claim 5, wherein the non-aqueous solvent comprises one or more of: dimethyl sulfoxide (DMSO), dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, or trichloroethylene.

8. The method of claim 5, wherein the binder comprises one or more of: a wax, a polymer, a gel, a semi-solid, or a metal.

9. The method of claim 8, wherein the binder comprises one or more of: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, poly ether ether ketone (PEEK), polyethylene naphthalate (PEN), polyethersulfone (PES), polyphenylene sulfide (PPS), or polyphenylene oxide (PPO).

10. The method of claim 5, wherein:
  the metal particles comprise iron, nickel, and silver,
  the non-aqueous solvent comprises DMSO,
  the binder comprises ABS, and
  the selective binding-enabling material comprises deionized water particles.

11. The method of claim 10, further comprising:
  disposing, using a nebulizer, a mist comprising the deionized water particles to a region about the intermediary article to cause partial coagulation of the intermediary article by exchanging the DMSO with the deionized water particles.

12. The method of claim 11, wherein forming the green body structure further comprises:
- after partial coagulation of the intermediary article, disposing the intermediary structure in a coagulation bath for a duration of about one hour to further exchange the DMSO with the deionized water particles, thereby further coagulating the green body structure prior to sintering.

13. A method comprising:
- forming a green body structure having dimensions and a form factor associated with a digital design for a printed article, wherein forming the green body structure comprises:
  - preparing a print feedstock comprising metal particles, a binder material, and a non-aqueous solvent;
  - on a printing platform, forming an intermediary structure from the print feedstock during a first time;
  - while forming the intermediary structure from the print feedstock, contacting the intermediary structure with a selective binding-enabling material to cause selective binding of at least a portion of the print feedstock to partially form the green body structure, the selective binding-enabling material comprising one or more of: water, deionized water, water vapor, water having a miscible solvent dissolved therein, or a non-solvent having a mutual miscibility with the non-aqueous solvent that satisfies a predetermined miscibility threshold; and
  - disposing the intermediary structure in a coagulation bath to cause further binding of the print feedstock to further form the green body structure, wherein the method further comprises:
- after further binding of the print feedstock in the coagulation bath too further form the green body structure, heating the green body structure to above a predetermined temperature such that the green body structure sinters, forming the printed article.

14. The method of claim 13, wherein the metal particles comprise one or more from among: iron, nickel, copper, silver, chromium, tin, titanium, cobalt, tungsten, vanadium, scandium, palladium, platinum, aluminum, gold, molybdenum, manganese, tantalum, beryllium, bismuth, hafnium, iridium, lanthanum, magnesium, niobium, osmium, silicon, yttrium, zinc, or zirconium.

15. The method of claim 13, wherein the non-aqueous solvent comprises one or more of: dimethyl sulfoxide (DMSO), dimethylformamide (DMF), acetonitrile, ethanol, acetone, acrylic acid, benzene, benzyl alcohol, carbon tetrachloride, chloroform, cyclohexanol, dioxane, dimethylacetamide, ethyl acetate, ethyleneglycolmonobutylether, ethyleneglycolmonomethylether, formamide, methanol, methyl acetate, methylene dichloride, methyl-pyrrolidone, propanol, tetrahydrofuran, toluene, or trichloroethylene.

16. The method of claim 13, wherein the binder comprises one or more of: a wax, a polymer, a gel, a semi-solid, or a metal.

17. The method of claim 16, wherein the binder comprises one or more of: thermoplastic polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, polyethylene, ultra-high molecular weight polyethylene, polypropylene, ethylene-butene copolymers, ethylene-hexene copolymers, thermosetting plastics, polyimide (PI), poly amide (PA), poly amide imide (PAI), polypropylene (PP), polyethylene (PE), ethylene vinylacetate (EVA), poly(ethylene terephthalate) (PET), poly(vinyl acetate) (PVA), poly lactic-co-glycolic acid (PLGA), polylactic acid (PLA), polyamide (PA), acrylic adhesives, ultraviolet (UV)/electron beam (EB)/infrared (IR) curable resin, poly ether ether ketone (PEEK), polyethylene naphthalate (PEN), polyethersulfone (PES), polyphenylene sulfide (PPS), or polyphenylene oxide (PPO).

18. The method of claim 13, wherein:
- the metal particles comprise iron, nickel, and silver,
- the non-aqueous solvent comprises DMSO,
- the binder comprises ABS, and
- the selective binding-enabling material comprises deionized water particles.

19. The method of claim 18, further comprising:
- disposing, using a nebulizer, a mist comprising the deionized water particles to a region about the intermediary article to cause partial coagulation of the intermediary article by exchanging the DMSO with the deionized water particles.

20. The method of claim 19, wherein the intermediary structure is disposed in the coagulation bath for a duration of about one hour to promote further exchange of the DMSO with the deionized water particles, thereby further coagulating the green body structure prior to sintering.

* * * * *

UNITED STATES PATENT AND TRADEMARK OFFICE
CERTIFICATE OF CORRECTION

PATENT NO. : 11,833,586 B2  
APPLICATION NO. : 17/915408  
DATED : December 5, 2023  
INVENTOR(S) : Huang et al.

Page 1 of 1

It is certified that error appears in the above-identified patent and that said Letters Patent is hereby corrected as shown below:

In the Claims

Column 56,
Line 13, in Claim 5, "the or the binder" should read --or the binder--.

Signed and Sealed this
Second Day of April, 2024

Katherine Kelly Vidal
*Director of the United States Patent and Trademark Office*